(12) United States Patent
Higuchi et al.

(10) Patent No.: US 12,145,264 B2
(45) Date of Patent: Nov. 19, 2024

(54) COMPONENT SUPPLY DEVICE

(71) Applicant: Konica Minolta, Inc., Tokyo (JP)

(72) Inventors: Yuki Higuchi, Toyokawa (JP); Shinichi Kawabata, Hino (JP); Tomoyoshi Yukimoto, Hachioji (JP); Takumi Sakurada, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 86 days.

(21) Appl. No.: 17/984,783

(22) Filed: Nov. 10, 2022

(65) Prior Publication Data

US 2023/0182284 A1 Jun. 15, 2023

(30) Foreign Application Priority Data

Dec. 13, 2021 (JP) ................. 2021-201567

(51) Int. Cl.
*B25J 9/00* (2006.01)
*B25J 9/16* (2006.01)
*B25J 19/04* (2006.01)

(52) U.S. Cl.
CPC ........... *B25J 9/0093* (2013.01); *B25J 9/0096* (2013.01); *B25J 9/1697* (2013.01); *B25J 19/04* (2013.01)

(58) Field of Classification Search
None
See application file for complete search history.

(56) References Cited

U.S. PATENT DOCUMENTS 10,843,333 B2 * 11/2020 Wagner .................. B25J 9/0093
11,242,211 B2 * 2/2022 Bennett ................ B25J 15/0014

FOREIGN PATENT DOCUMENTS

JP H06127698 5/1994

* cited by examiner

*Primary Examiner* — Kavel Singh
(74) *Attorney, Agent, or Firm* — BakerHostetler

(57) ABSTRACT

A component supply device includes a hopper, a conveyance robot, a pick-up stand, and a discharge stand. A temporary placement position at which the component is temporarily placed on the tray is disposed on a straight line connecting a supply position at which the component is supplied to the conveyance robot in the hopper and a hand-over position at which the component is delivered from the conveyance robot on the discharge stand. The discharge stand includes a posture changer that changes a posture of the component conveyed by the conveyance robot.

9 Claims, 22 Drawing Sheets

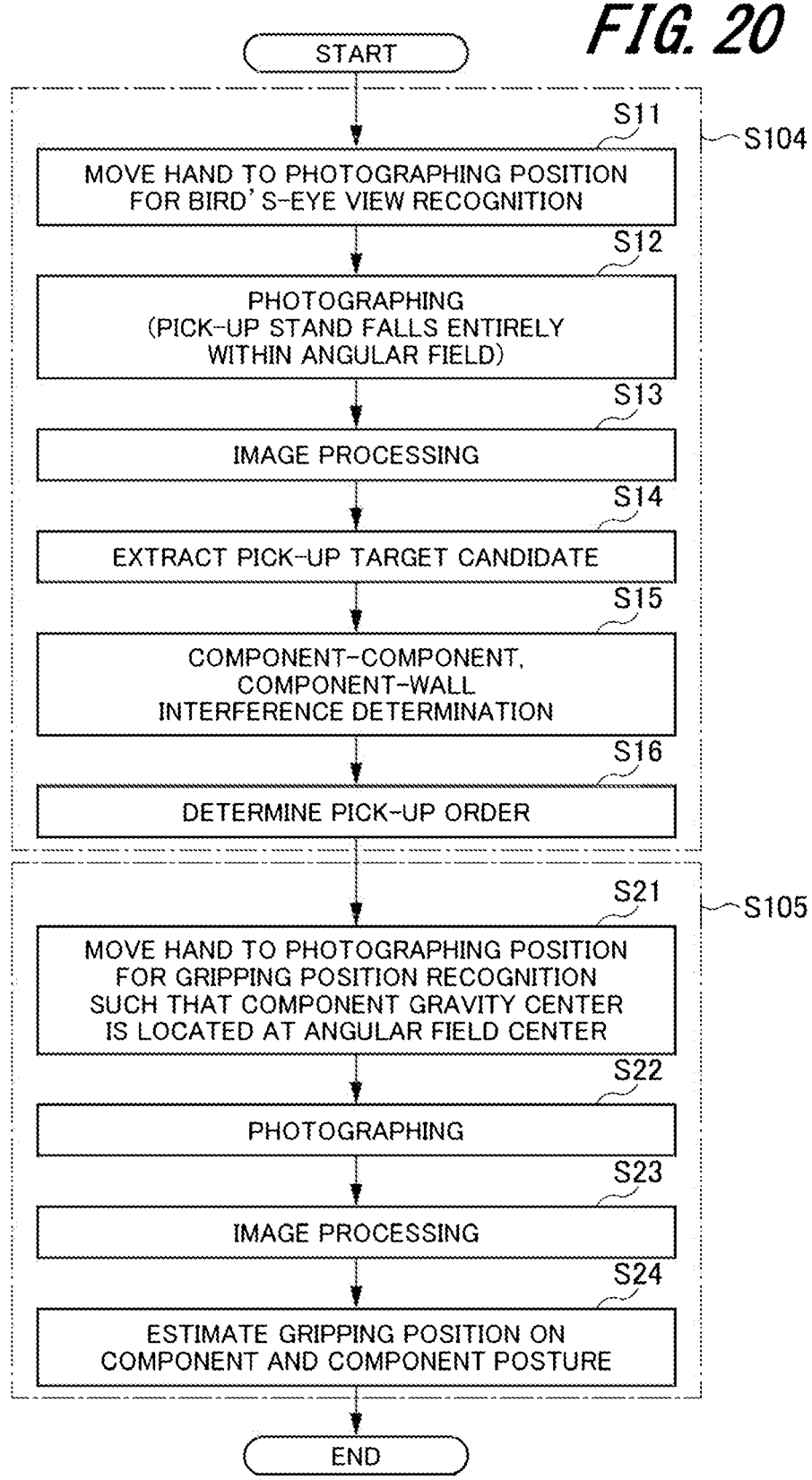

COMPONENT SUPPLY DEVICE

CROSS-REFERENCE TO RELATED APPLICATIONS

The present application claims priority to Japanese Patent Application No. 2021-201567, filed on Dec. 13, 2021, the disclosure of which is incorporated herein in its entirety.

BACKGROUND

Technological Field

The present invention relates to a component supply device.

Description of the Related Art

In recent years, there has been proposed a component supply device that takes out a small amount of components from a stacked component group and supplies the components to a predetermined position. A conventional technique of this type is described in, for example, Patent Literature 1. Patent Literature 1 describes a component supply device including an image recognition device that recognizes a posture of a component and selects a component in a desirable posture that can be supplied, and a handling device that grasps and disperses a plurality of components from among overlapped components, grasps a component selected by the image recognition device from among the dispersed components, and carries the component to a component supply location.

RELATED ART LITERATURE

Patent Literature

Patent Literature 1: JP H6-127698 A

SUMMARY

However, in the technique described in Patent Literature 1, when a component is taken out from a component group or when the component is conveyed, since the posture of a hand in a conveyance robot should be changed in accordance with the posture taken by the component which has been placed, the operation of the conveyance robot becomes complicated. Furthermore, in order to secure a movable range for changing the posture of the conveyance robot, it is necessary to widen an interval between the supply position and the conveyance position of the component.

Accordingly, in addition to a problem that the posture of the conveyance robot needs to be changed, the technique described in Patent Literature 1 involves another problem that the distance for conveying a component in the conveyance robot becomes long, and a time taken for conveying the component becomes long.

In view of the above-mentioned conventional problems, it is an object of the present invention to provide a component supply device allowing the reduction of a component conveyance time.

In order to solve the above problems and achieve the object of the present invention, a component supply device includes a hopper, a conveyance robot, a pick-up stand, and a discharge stand. The hopper has a storage container in which a component is stored. The conveyance robot grips and conveys the component. The pick-up stand has a tray on which the component conveyed from the hopper by the conveyance robot is placed. The component placed on the tray is conveyed by the conveyance robot to the discharge stand.

A temporary placement position at which the component is temporarily placed on the tray is disposed on a straight line connecting a supply position at which the component is supplied to the conveyance robot in the hopper and a hand-over position at which the component is delivered from the conveyance robot on the discharge stand.

The discharge stand includes a posture changer that changes a posture of the component conveyed by the conveyance robot.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 20 is a flowchart illustrating a component recognition operation in the component supply operation of the component supply device according to the embodiment of the present invention;

DETAILED DESCRIPTION OF EMBODIMENTS

Figure 1:
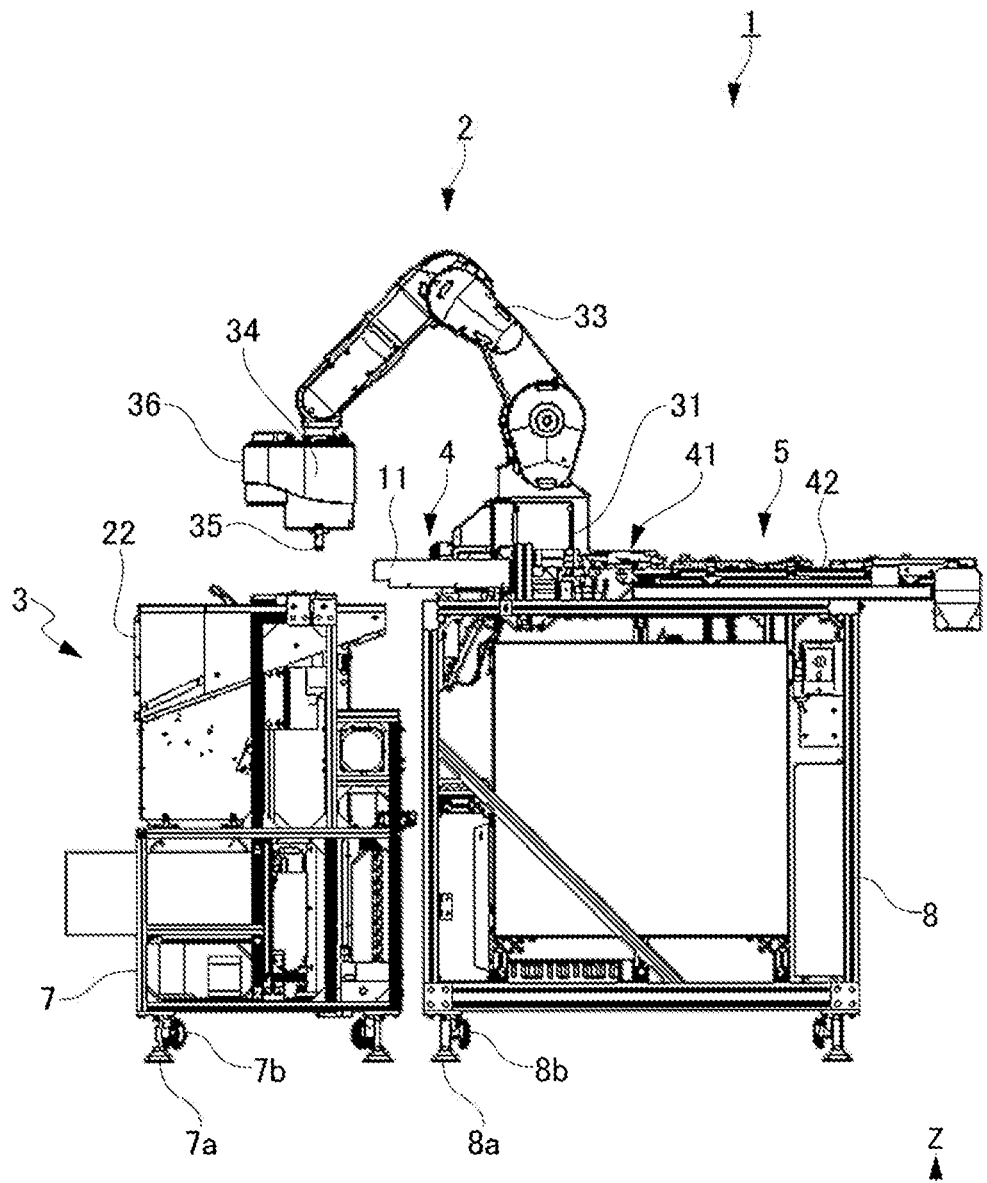
FIG. 1 is a side view illustrating a component supply device according to an embodiment of the present invention.

Hereinafter, an embodiment for carrying out the present invention will be described with reference to FIGS. 1 to 23. Note that, in the drawings, the same components are denoted by the same reference numerals. Besides, the scope of the present invention is not limited to the embodiment described below.

Hereinafter, one or more embodiments of the present invention will be described with reference to the drawings. However, the scope of the invention is not limited to the disclosed embodiments.

1. Embodiment 1-1. Configuration of Component Supply Device

First, an overall configuration of a component supply device according to an embodiment (hereinafter, referred to as "present example") of the present invention will be described with reference to FIGS. 1 and 2. FIG. 1 is a side view of a component supply device 1 of the present example, and FIG. 2 is a plan view of the component supply device 1 of the present example.

Figure 2:
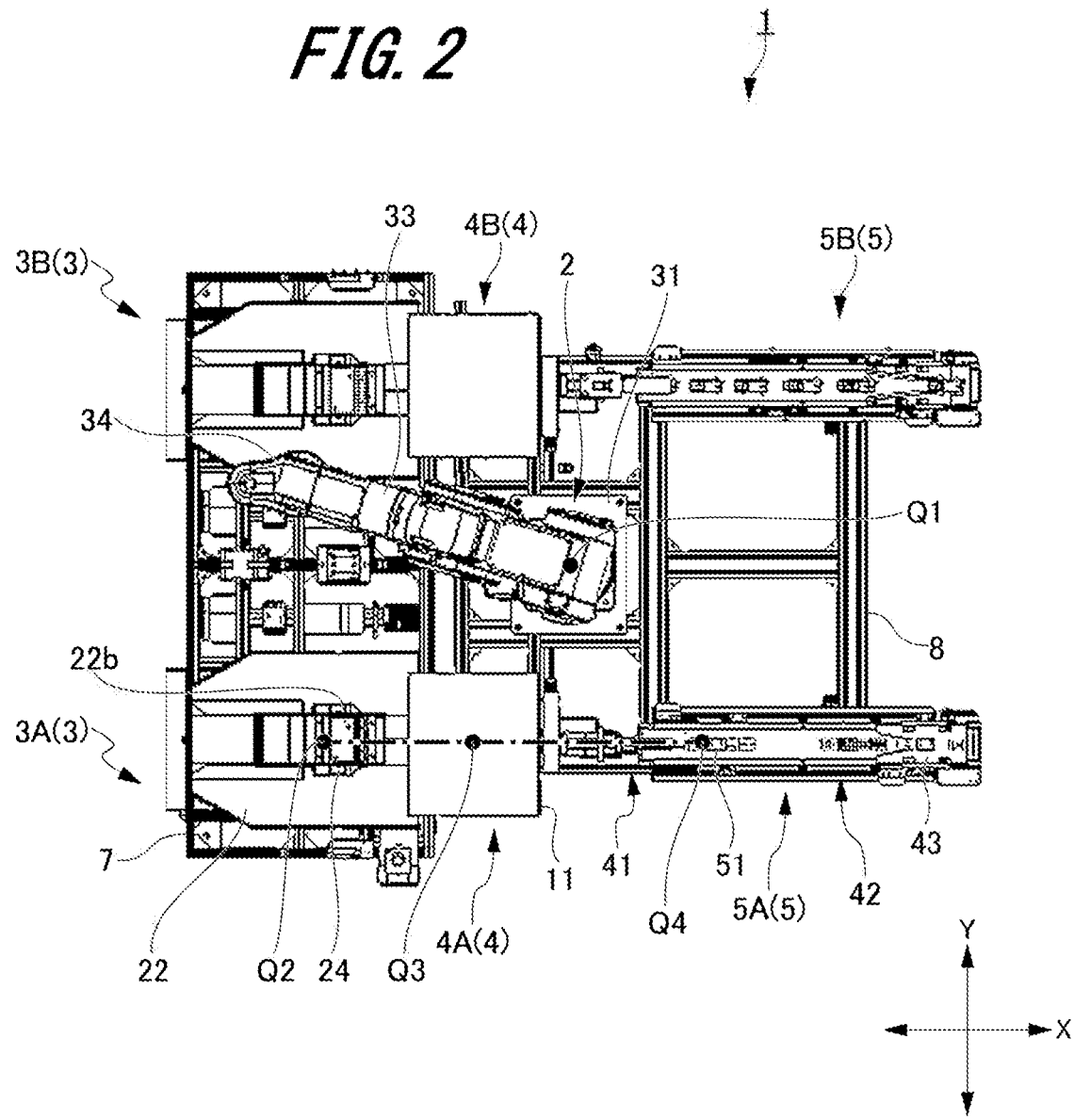
FIG. 2 is a plan view illustrating the component supply device according to the embodiment of the present invention.

The component supply device 1 illustrated in FIGS. 1 and 2 is a device that supplies a component to a downstream-side process. As illustrated in FIGS. 1 and 2, the component supply device 1 includes two hoppers 3A and 3B, two pick-up stands 4A and 4B, two discharge stands 5A and 5B, and a conveyance robot 2.

Components are stored in the hoppers 3A and 3B. The hoppers 3A and 3B deliver the stored components to the conveyance robot 2. At this time, the conveyance robot 2 receives at least one or more components from the hoppers 3A and 3B. The components received by the conveyance robot 2 are temporarily placed flat (temporarily placed) on the pick-up stands 4A and 4B. Then, the conveyance robot 2 captures images of the components placed flat on the pick-up stands 4A and 4B by an image capturer 36 described later, and checks the state of the components.

Furthermore, the conveyance robot 2 grips one predetermined component out of the components temporarily placed on the pick-up stands 4A and 4B, and conveys the component to the discharge stands 5A and 5B. The discharge stands 5A and 5B discharge the components conveyed from the conveyance robot 2 to a downstream-side process or device.

The hoppers 3A and 3B, the pick-up stands 4A and 4B, and the discharge stands 5A and 5B are placed in this order from the upstream side in the component conveying direction. Here, the component conveying direction is referred to as a first direction X, and a direction orthogonal to the first direction X and parallel to the horizontal direction is referred to as a second direction Y. A direction orthogonal to the first direction X and the second direction Y and parallel to the vertical direction is referred to as a third direction Z.

The first hopper 3A, the first pick-up stand 4A, and the first discharge stand 5A are placed on one side in the second direction Y, and the second hopper 3B, the second pick-up stand 4B, and the second discharge stand 5B are placed on the other side in the second direction Y. That is, the component supply device 1 of the present example includes two component supply lines: a first supply line including the first hopper 3A, the first pick-up stand 4A, and the first discharge stand 5A; and a second supply line including the second hopper 3B, the second pick-up stand 4B, and the second discharge stand 5B.

The conveyance robot 2 is placed between two supply lines. Specifically, the conveyance robot 2 is placed between the pick-up stands 4A and 4B and the discharge stands 5A and 5B in the first direction X, and is placed between the first pick-up stand 4A and the second pick-up stand 4B in the second direction Y.

The first hopper 3A and the second hopper 3B are supported by a first frame 7. The conveyance robot 2, the pick-up stands 4A and 4B, and the discharge stands 5A and 5B are supported by a second frame 8 that is different from the first frame 7. In this manner, the conveyance robot 2, the pick-up stands 4A and 4B, and the discharge stands 5A and 5B are placed in the frame 8 that is different from the frame for the hoppers 3A and 3B, thereby preventing the vibration caused by the hoppers 3A and 3B from being transmitted to the conveyance robot 2, the pick-up stands 4A and 4B, and the discharge stands 5A and 5B. As a result, it is possible to prevent the vibration of the hoppers 3A and 3B from affecting the component recognition operation performed by the conveyance robot 2, the component posture changing operation performed by the discharge stands 5A and 5B, and the component conveyance operation. Furthermore, by placing the hoppers 3A and 3B on the frame 7 that is different from the frame for other devices, it becomes possible to easily replace only the hoppers 3A and 3B.

Although the example in which the conveyance robot 2, the pick-up stands 4A and 4B, and the discharge stands 5A and 5B are placed on the same frame 8 has been shown, the present invention is not limited thereto, and the conveyance robot 2, the pick-up stands 4A and 4B, and the discharge stands 5A and 5B may be placed separately on different frames.

A leg 7a is provided at a lower end of the first frame 7 in the third direction Z, and similarly, a leg 8a is provided at a lower end of the second frame 8 in the third direction Z. The legs 7a and 8a are configured to be stretchable along the third direction Z. The legs 7a and 8a can provide a gap, into which a conveyance member such as a hand lifter can be inserted, between the first frame 7 and the second frame 8 and a floor surface. As a result, it becomes possible to convey the first frame 7 and the second frame 8 to predetermined positions. When the first frame 7 and the second frame 8 have been conveyed to the predetermined positions, anchor stays are fixed to the legs 7a and 8a thereof. Then, by fixing the anchor stays to the floor surface, the first frame 7 and the second frame 8 are placed at predetermined positions.

Furthermore, a caster 7b is provided near the leg 7a of the first frame 7, and a caster 8b is similarly provided near the leg 8a of the second frame 8. After the conveyance of the first frame 7 and the second frame 8 by a hand lifter or the like, the placement positions of the first frame 7 and the second frame 8 can be finely adjusted by the casters 7b and 8b.

Since the first hopper 3A and the second hopper 3B have the same configuration, the first hopper 3A will be described below, and the first hopper 3A will be simply referred to as a hopper 3. Besides, since the first pick-up stand 4A and the second pick-up stand 4B have the same configuration, the first pick-up stand 4A will be described below, and the first pick-up stand 4A will be simply referred to as a pick-up stand 4. Additionally, since the first discharge stand 5A and the second discharge stand 5B have the same configuration, the first discharge stand 5A will be described below, and the first discharge stand 5A will be simply referred to as a discharge stand 5.

The pick-up stand 4 is placed between the hopper 3 and the discharge stand 5. Here, a position, in the hopper 3, at which a component is supplied to the conveyance robot 2 is referred to as a supply position Q2, and a position, in the discharge stand 5, at which the component is handed over from the conveyance robot 2 is referred to as a hand-over position Q4. A position, in the pick-up stand 4, at which the component is temporarily placed is referred to as a temporary placement position Q3. The temporary placement position Q3 in the pick-up stand 4 is placed on a straight line connecting the supply position Q2 and the hand-over position Q4. A straight line connecting the supply position Q2, the temporary placement position Q3, and the hand-over position Q4 is placed in parallel to the first direction X.

Figure 3:
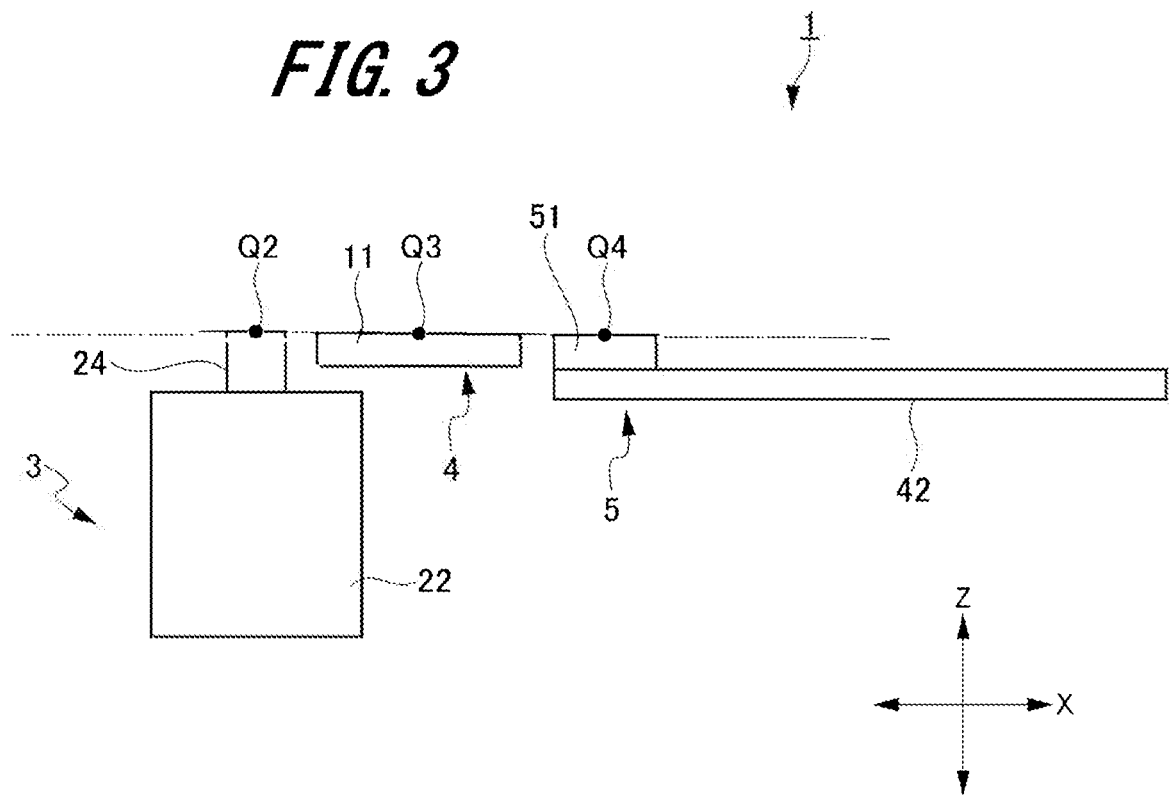
FIG. 3 is a schematic view illustrating a component hand-over height in the component supply device according to the embodiment of the present invention.

FIG. 3 is a schematic view illustrating the component hand-over height in the component supply device 1.

As illustrated in FIG. 3, the height of the supply position Q2 of the hopper 3 in the third direction Z, the height of the temporary placement position Q3 of the pick-up stand 4, and the height of the hand-over position Q4 in the discharge stand 5 are set to be substantially equal to each other. As illustrated in FIG. 1, the heights of the supply position Q2, the temporary placement position Q3, and the hand-over position Q4 can be adjusted to desired heights by adjusting the lengths of the legs 7a and 8a provided in the first frame 7 and the second frame 8 in the third direction Z.

1-2. Configuration of Pick-Up Stand

Next, a detailed configuration of the pick-up stand 4 will be described with reference to FIGS. 4 to 6.

Figure 4:
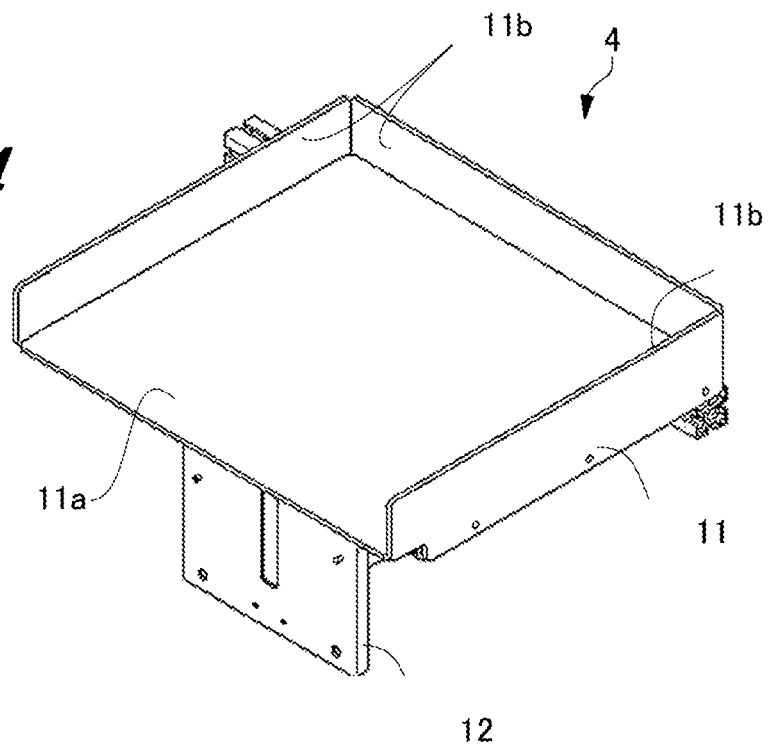
FIG. 4 is a perspective view illustrating a pick-up stand of the component supply device according to the embodiment of the present invention.
Figure 5:
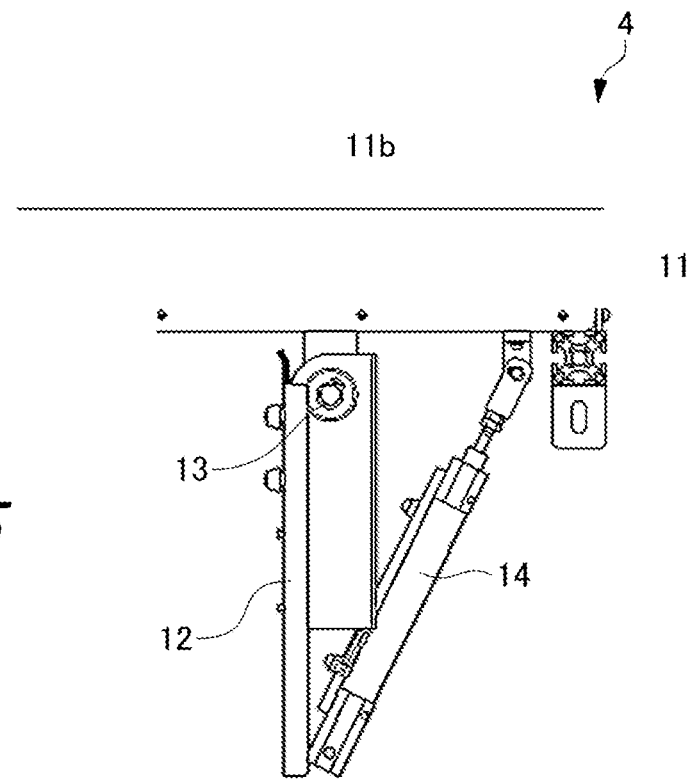
FIG. 5 is a side view illustrating the pick-up stand of the component supply device according to the embodiment of the present invention.
Figure 6:
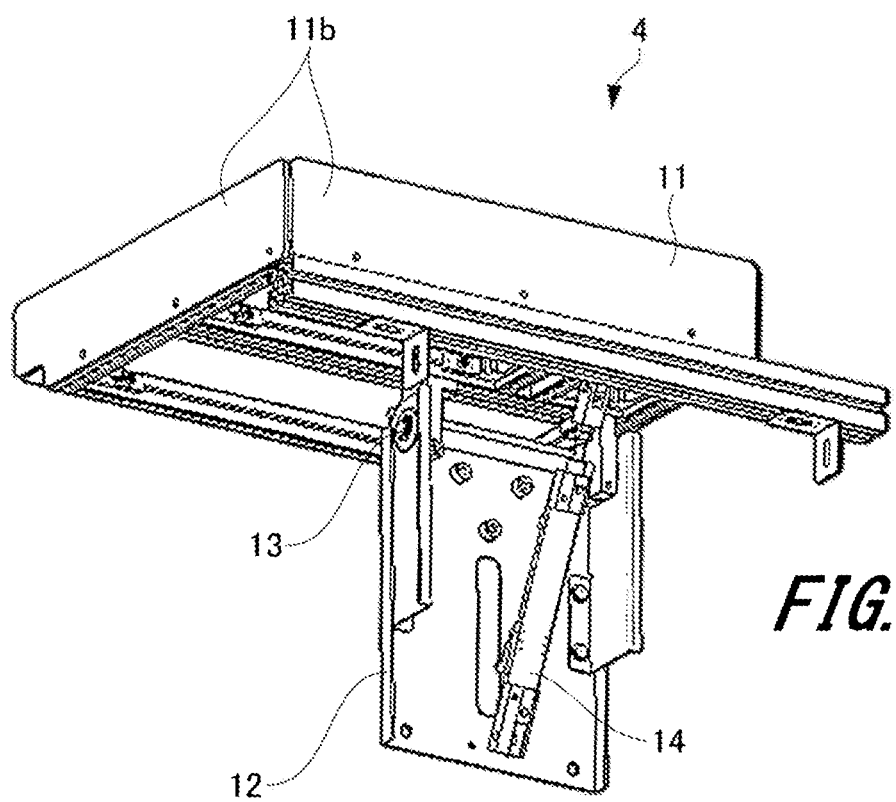
FIG. 6 is a perspective view illustrating the pick-up stand of the component supply device according to the embodiment of the present invention when viewed from a direction different from that of FIG. 4.

FIG. 4 is a perspective view illustrating the pick-up stand 4, FIG. 5 is a side view illustrating the pick-up stand 4, and FIG. 6 is a perspective view of the pick-up stand 4 when viewed from a direction different from that of FIG. 4.

As illustrated in FIGS. 4 to 6, each of the pick-up stands 4 includes a tray 11 on which a component is placed, a support 12 that supports the tray 11, a rotating shaft 13, and a movable mechanism 14. As illustrated in FIGS. 2 and 3, the tray 11 corresponds to the temporary placement position Q3. As illustrated in FIGS. 4 to 6, the tray 11 is formed in a dish shape having an upper section in the vertical direction that opens. Besides, the tray 11 includes a placement surface 11a and three wall surfaces 11b.

A component is temporarily placed on the placement surface 11a. The placement surface 11a is formed in a substantially rectangular shape. The size of the placement surface 11a is set in accordance with the imaging angular field of the image capturer 36 of the conveyance robot 2 described later. An upper surface, of the placement surface 11a, on which a component is placed, is formed by a material and with a color which suppress the reflection of light. Examples of the color of the placement surface 11a include an intermediate color of white and black. As a result, it becomes possible to suppress irregular reflection of the illumination used when the image capturer 36 captures an image of a component on the upper surface of the placement surface 11a.

Furthermore, the placement surface 11a is attached to the tray 11 in an attachable/detachable manner with, for example, a double-sided tape or the like. Thus, when the placement surface 11a is damaged due to the flat placement of a component or the rubbing of the gripper 35 of the conveyance robot 2 described later, a placement surface can be replaced with a new placement surface 11a. As a result, when the image capturer 36 of the conveyance robot 2 photographs the component placed flat on the tray 11, it is possible to prevent the component from being erroneously recognized due to a scratch on the placement surface 11a so as to accurately recognize the component. Besides, by replacing the placement surface 11a with a placement surface 11a having an optimum color according to color of a component to be supplied, the recognition accuracy of the component can be improved.

Note that, although the example in which the placement surface 11a is formed in a rectangular shape has been shown, the placement surface is not limited thereto, may be formed in various other shapes such as a substantially circular shape and a hexagonal shape, and may have a shape corresponding to the imaging angular field of the image capturer 36.

Wall surfaces 11b are formed on three of four sides of the placement surface 11a. Each wall surface 11b projects upward in the vertical direction substantially vertically from an end of the placement surface 11a. The three of four sides of the placement surface 11a are surrounded by the three wall surfaces 11b. As a result, it is possible to prevent the component placed on the placement surface 11a from falling from the placement surface 11a. One side of the four sides of the placement surface 11a, on the hopper 3 side, that is, on the upstream side in the component conveying direction, is open.

The tray 11 is rotatably supported by the support 12 via a rotating shaft 13. The rotating shaft 13 and the support 12 are placed at a lower end of the tray 11 in the vertical direction.

A movable mechanism 14 is provided at the lower end of the tray 11. The movable mechanism 14 is configured by an air cylinder. One end of the movable mechanism 14 is connected to an end, at the lower end of the tray 11, on the downstream side in the component conveying direction. Besides, the one end of the movable mechanism 14 is placed on the downstream side in the conveying direction with respect to the rotating shaft 13 connected to the tray 11.

When the movable mechanism 14 stretches, the end, of the tray 11, on the downstream side in the conveying direction is pressed upward in the vertical direction. Therefore, the tray 11 rotates about the rotating shaft 13, and the end, of the tray 11, on the downstream side in the conveying direction jumps upward in the vertical direction. Thus, a component temporarily placed on the tray 11 falls through an opening provided on the upstream side in the conveying direction. As a result, components which are not conveyed, from among the components temporarily placed on the tray 11, can be returned to the hopper 3.

Although the example in which the air cylinder is used as the movable mechanism 14 has been shown, the present invention is not limited thereto. As the movable mechanism 14, for example, a driving unit that directly rotates the rotating shaft 13 may be applied, or various other mechanisms may be used. Furthermore, although the example in which the tray 11 is rotated to return the components to the hopper 3 has been shown, the present invention is not limited thereto, and a pusher or the like that presses the components placed on the tray 11 toward the hopper 3 may be used.

1-3. Configuration of Hopper

Next, a detailed configuration of the hopper 3 will be described with reference to FIGS. 7 to 10.

Figure 7:
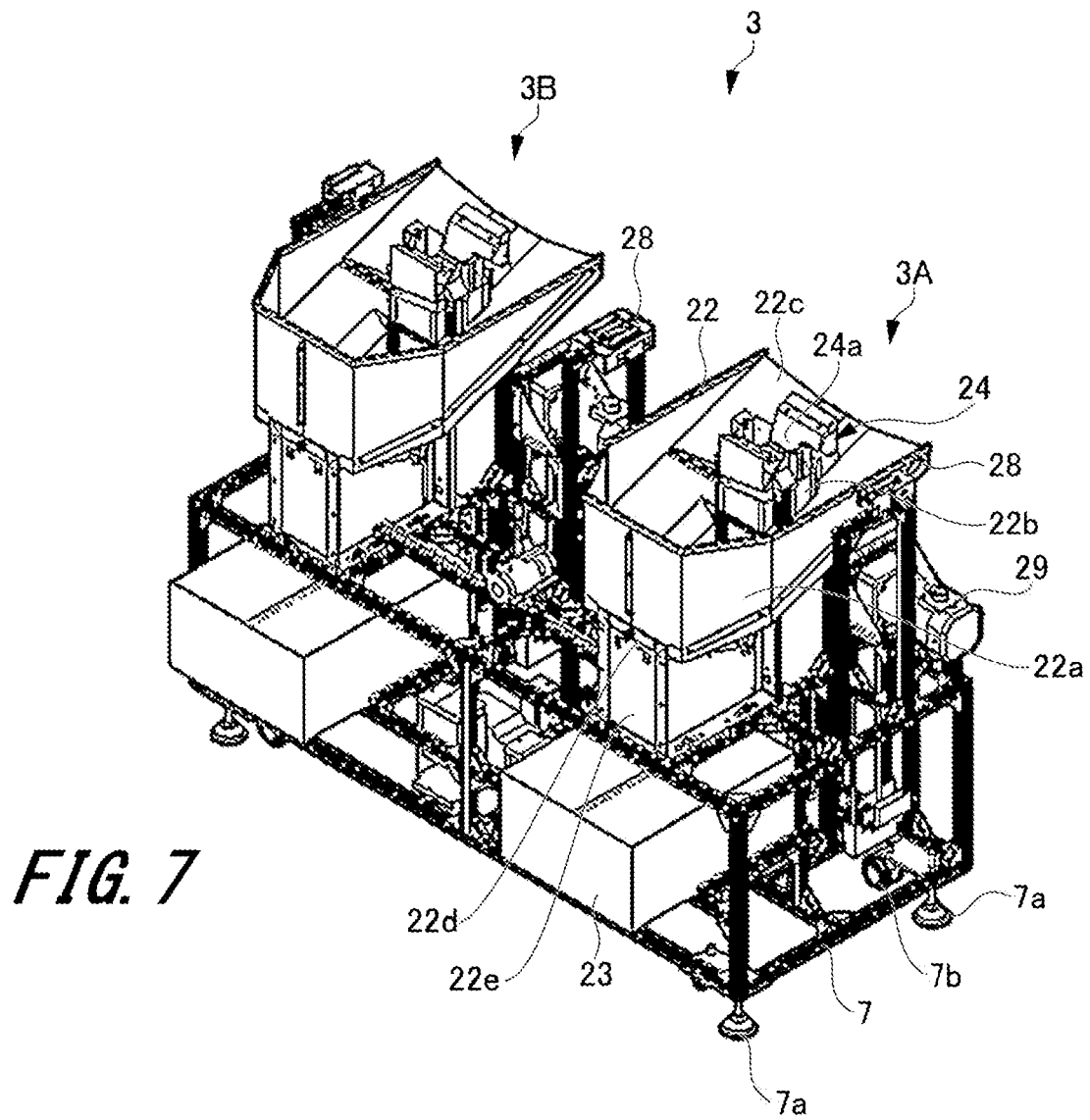
FIG. 7 is a perspective view illustrating a hopper of the component supply device according to the embodiment of the present invention in a state where a push-up has risen.
Figure 8:
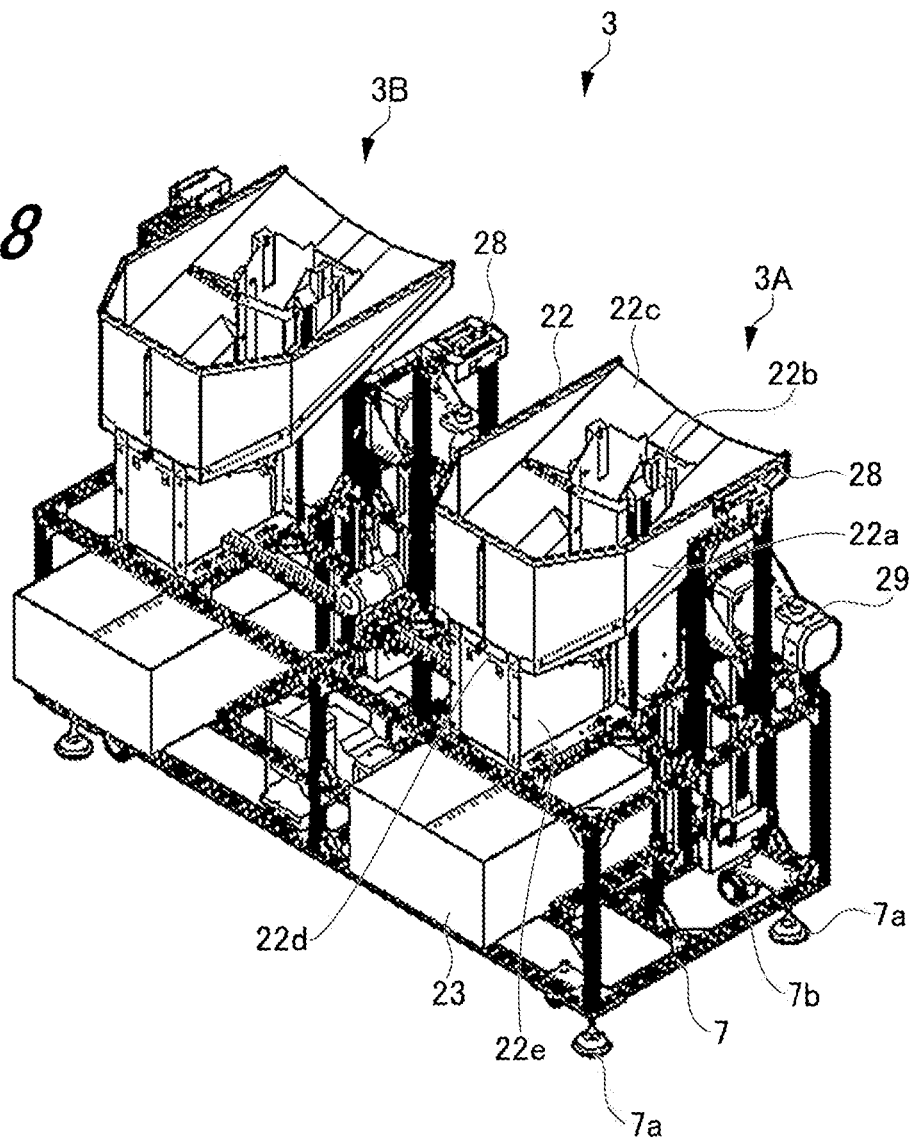
FIG. 8 is a perspective view illustrating the hopper of the component supply device according to the embodiment of the present invention in a state where the push-up has lowered.
Figure 9:
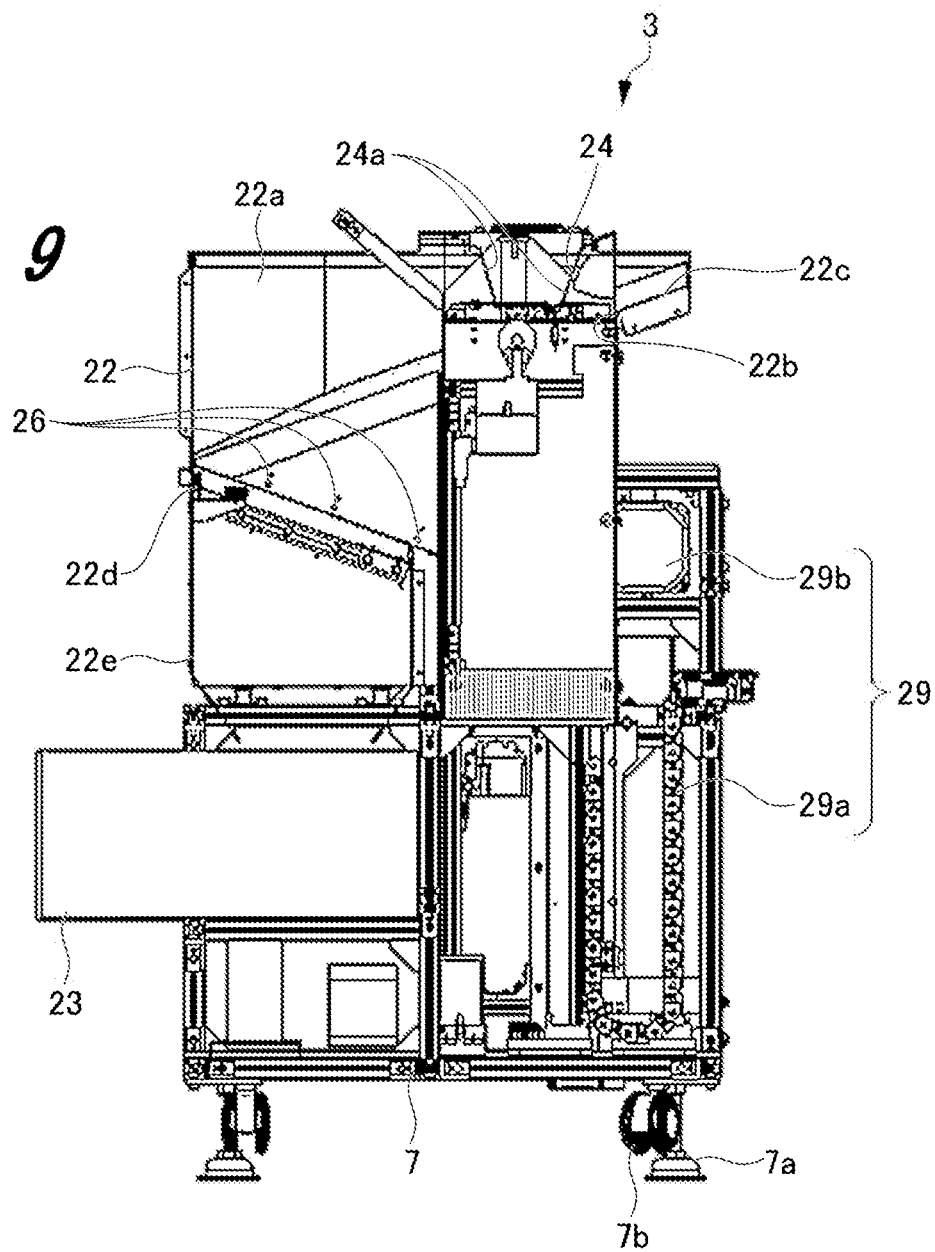
FIG. 9 is a cross-section view illustrating the hopper of the component supply device according to the embodiment of the present invention in a state where the push-up has risen.
Figure 10:
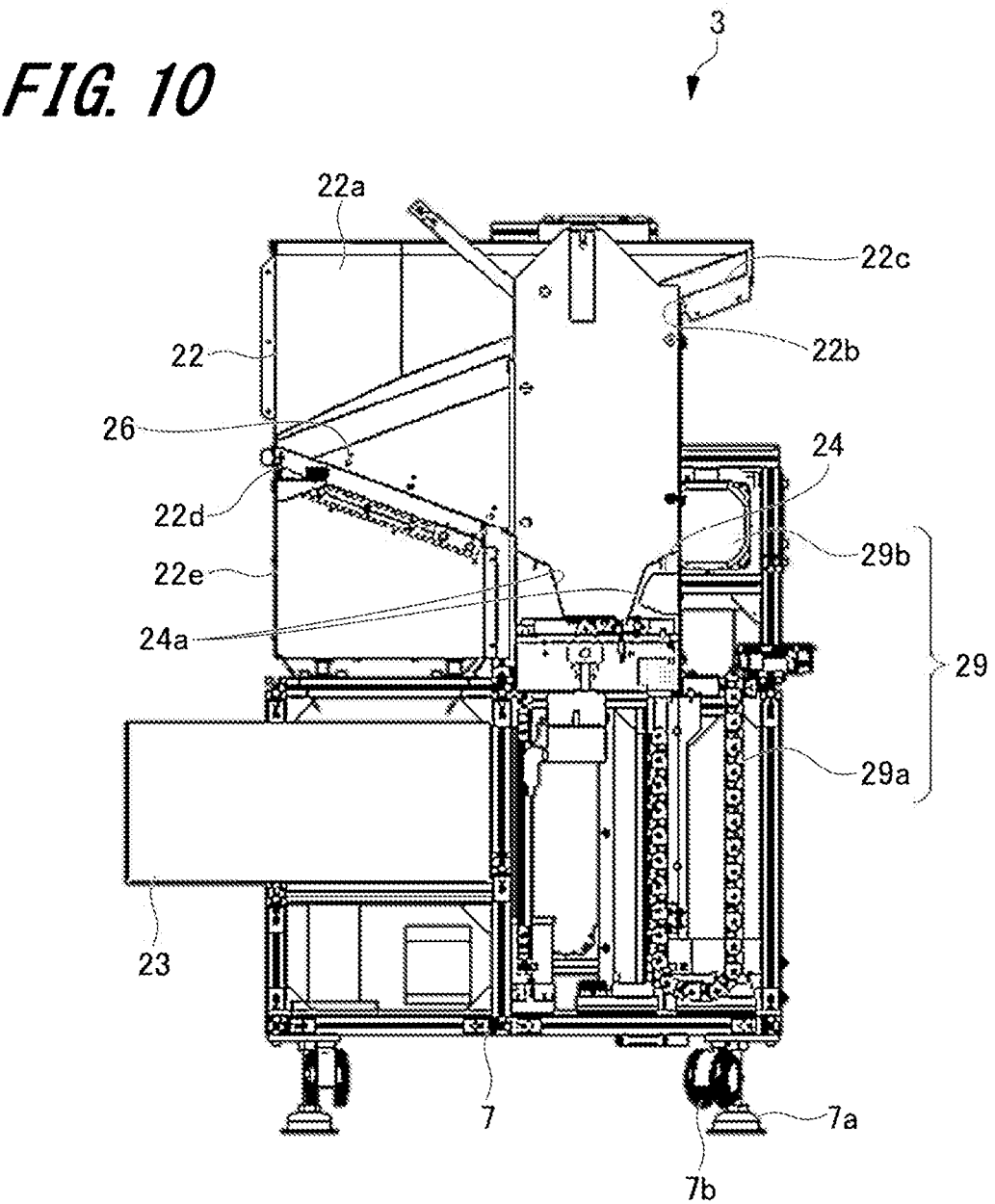
FIG. 10 is a cross-section view illustrating the hopper of the component supply device according to the embodiment of the present invention in a state where the push-up has lowered.
Figure 19:
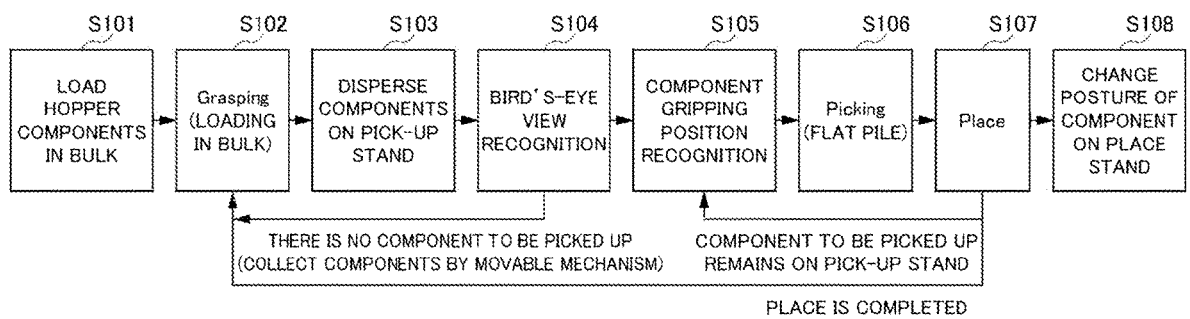
FIG. 19 illustrates a component supply operation of the component supply device according to the embodiment of the present invention.

FIGS. 7 and 8 are perspective views illustrating the hopper 3, and FIGS. 9 and 10 are cross-section views illustrating the hopper 3. FIGS. 7 and 9 illustrate a state in which the push-up 24 described later has risen, and FIGS. 8 and 19 illustrate a state in which the push-up 24 described later has lowered.

As illustrated in FIGS. 7 to 10, the hopper 3 includes a support stand 21, a storage container 22, a collection unit 23, a push-up 24, a residual amount detection sensor 26, an upper surface detection sensor 28, and a driving unit 29. The storage container 22, the collection unit 23, the push-up 24, the upper surface detection sensor 28, and the driving unit 29 are supported by the support stand 21.

The storage container 22 is a box-shaped container having an upper surface in the vertical direction being opened. The storage container 22 includes a side surface 22a forming a wall surface of the storage container 22, a hoisting path 22b, an inclined surface 22c, a collection shutter 22d, and a collection path 22e.

The inclined surface 22c is placed in a space surrounded by the plurality of side surfaces 22a. The inclined surface 22c is inclined such that the height thereof in the vertical direction decreases continuously from the side surface 22a toward the center of the storage container 22. The inclined surface 22c is highest at an end of the storage container 22 on the pick-up stand 4 side and is inclined toward the bottom surface of the storage container 22. Furthermore, the hoisting path 22b is formed in the inclined surface 22c on the center side of the storage container 22. The hoisting path 22b is a path that opens along the vertical direction.

Furthermore, the collection shutter 22d is provided on a bottom surface of the storage container 22. As illustrated in FIGS. 9 and 10, the collection shutter 22d is inclined toward the center of the storage container 22, that is, the hoisting path 22b. The collection shutter 22d covers an opening provided on the bottom surface of the storage container 22 in an openable/closable manner. The collection path 22e is connected to the bottom surface of the storage container 22 via the collection shutter 22d. The collection path 22e communicates with an opening provided on the bottom surface of the storage container 22.

Furthermore, the collection unit 23 is placed below the collection path 22e in the vertical direction. When the collection shutter 22d is opened, the components stored in the storage container 22 pass through the opening and the collection path 22e and fall into the collection unit 23. Thus, it is possible to easily collect components which have remained in the storage container 22 after the supply operation is completed.

Furthermore, a residual amount detection sensor 26 is provided in the vicinity of the collection shutter 22d on a bottom surface of the storage container 22. The residual amount detection sensor 26 is placed in an upper section in the vertical direction with respect to the collection shutter 22d. The residual amount detection sensor 26 detects the residual amount of components stored in the storage container 22.

As illustrated in FIGS. 1 and 3, the height of the storage container 22 is adjusted such that an upper end of the storage container 22 in the vertical direction is placed at a position lower than the tray 11 of the pick-up stand 4.

The push-up 24 is placed so as to be movable in the vertical direction along the hoisting path 22b. The push-up 24 is hoistably driven by the driving unit 29. The driving unit 29 includes a driving motor 29a and a driving chain 29b. Note that a mechanism for hoistably driving the push-up 24 is not limited to the driving motor 29a and the driving chain 29b, and other various drive mechanisms may be applied.

A recess 24a is formed at an upper end of the push-up 24 in the vertical direction. As illustrated in FIG. 10, when the push-up 24 is lowered downward in the vertical direction, the recess 24a is placed on a bottom surface of the storage container 22. At this time, a small quantity of components, from among the components stored in the storage container 22, are housed in the recess 24a.

Then, as illustrated in FIGS. 7 and 9, when the push-up 24 moves upward in the vertical direction, the recess 24a projects upward in the vertical direction from the hoisting path 22b. Thus, the components housed in the recess 24a can be pushed up to a predetermined height. As illustrated in FIG. 2, the recess 24a of the push-up 24 corresponds to the supply position Q2 of the hopper 3. As a result, the position at which components are handed over to the conveyance robot 2 can be fixed at a specific position.

Furthermore, as illustrated in FIG. 3, by pushing up a component to a predetermined height by the push-up 24, the height of the supply position Q2 can be set to equal to the height of the temporary placement position Q3 or the hand-over position Q4.

The push-up 24 is configured to be separable from the storage container 22. That is, the push-up 24 can be removed alone from the first frame 7. As a result, the push-up 24 can be replaced alone, and the maintainability of the push-up 24 can be improved.

The upper surface detection sensor 28 is placed at the upper end of the storage container 22 in the vertical direction. The upper surface detection sensor 28 detects a state of an upper surface of a component stored in the storage container 22. The storage container 22 is provided with a vibrator (not illustrated). The vibrator is driven on the basis of information detected by the upper surface detection sensor 28. As a result, the storage container 22 is vibrated by the vibrator, and the upper surface of a component stored in the storage container 22 can be smoothed.

1-4. Configuration of Conveyance Robot

Figure 11:
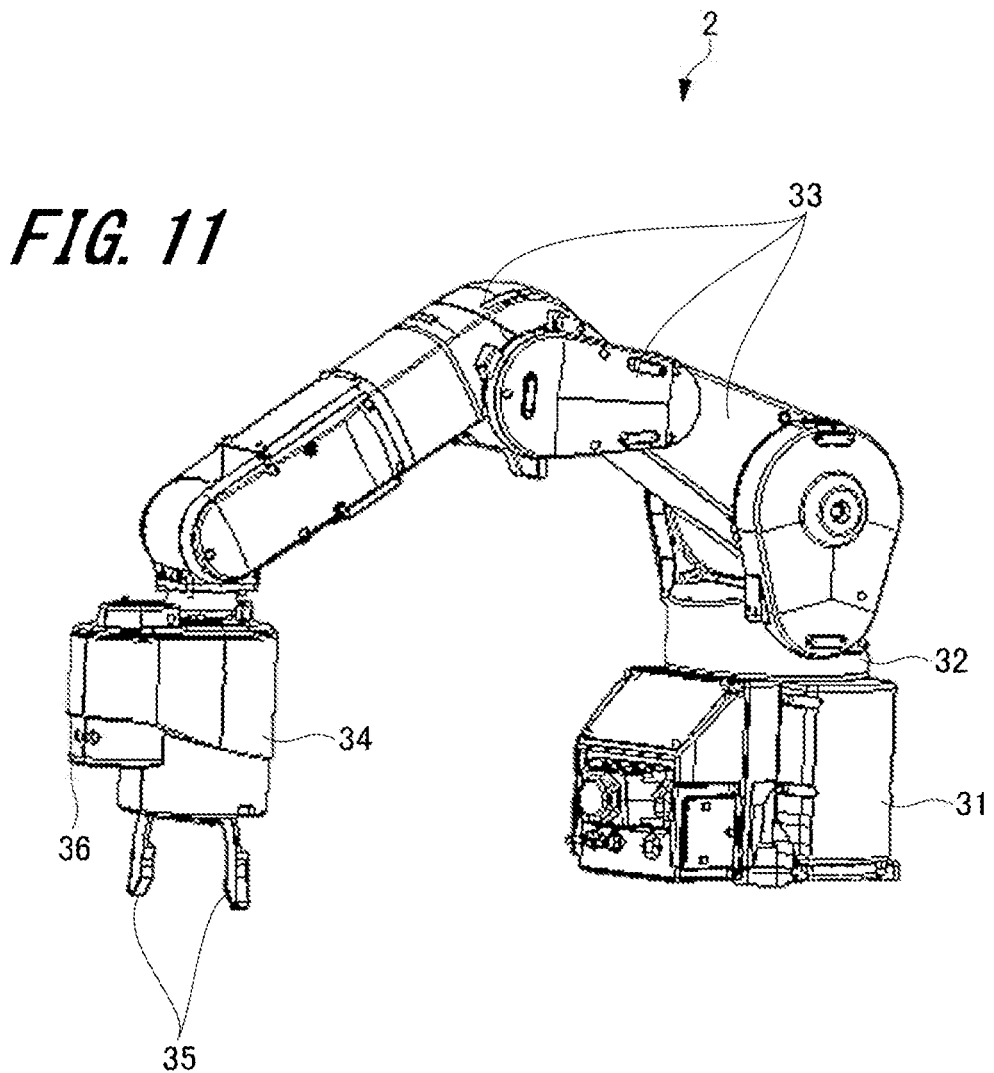
FIG. 11 is a perspective view illustrating a conveyance robot of the component supply device according to the embodiment of the present invention.

Next, a detailed configuration of the conveyance robot will be described with reference to FIG. 11. FIG. 11 is a perspective view illustrating the conveyance robot 2.

As illustrated in FIG. 11, the conveyance robot 2 is an articulated robot having a plurality of axes. The conveyance robot 2 includes a base stand 31, a rotating portion 32, a plurality of arms 33, a hand 34, a gripper 35, and an image capturer 36. The rotating portion 32 is supported on the base stand 31 so as to be rotatable in the horizontal direction. As illustrated in FIG. 2, the rotation center Q1 of the rotating portion 32 in the conveyance robot 2 is located in a middle part between the two supply lines in the second direction Y. Besides, the rotation center Q1 of the conveyance robot 2 is located near the temporary placement position Q3 in the first direction X.

The rotation center Q1 of the conveyance robot 2 is set at the center position of the entire component supply device 1. Accordingly, even if the configurations and positions of the hopper 3, the pick-up stand 4, and the discharge stand 5 are changed, it is possible to secure the origin of the position of the arm 33 of the conveyance robot 2 described later. As a result, it is possible to easily control the conveyance robot 2.

Besides, as illustrated in FIG. 11, a plurality of arms 33 are connected to the rotating portion 32. The plurality of arms 33 are provided with a plurality of shafts, and each arm 33 is supported so as to be rotatable around the shaft. The hand 34 is provided at a distal end of each of the plurality of arms 33.

The hand 34 is provided with two grippers 35, the image capturer 36, and an irradiation unit (not illustrated) that irradiates a component with light. The two grippers 35 are supported by the hand 34 so as to be approachable and separable. Then, the two grippers 35 approach each other and separate from each other to grip a plurality of components or only one component. Furthermore, elastic members are provided at the tips of the two grippers 35. Accordingly, it is possible to grip a component without scratching it.

Note that the configuration of the gripper 35 is not limited to the abovementioned configuration, and for example, a component may be gripped by three or four grippers 35, or a suction pad that sucks a component may be provided.

The image capturer 36 captures an image of a component placed on the placement surface 11a of the pick-up stand 4. At this time, by irradiating the component with light by the irradiation unit, the shape and posture of the component can be accurately imaged. Information captured by the image capturer 36 is outputted to a controller (not illustrated). The controller determines a state of interference between components and selects a component to be conveyed to the discharge stand 5 on the basis of the information captured by the image capturer 36.

The controller determines the posture of a component placed on the placement surface 11a of the pick-up stand 4 on the basis of the information captured by the image capturer 36. Then, the controller transmits information pertaining to the determined posture of the component to a posture changer 41 of the discharge stand 5 described later.

The controller includes, for example, a central processing unit (CPU), a read only memory (ROM) for storing a program and the like executed by the CPU, and a random-access memory (RAM) used as a working area of the CPU.

The CPU is connected to respective units constituting the component supply device 1 via a system bus. Then, the CPU controls the operations of respective units through communications with these units connected via the system bus. The RAM temporarily stores data and the like necessary for the CPU to execute the program. The ROM is configured by a nonvolatile memory such as a semiconductor memory, and stores a system program corresponding to the component supply device 1, various programs that are executable on the system program, and the like. The program stored in the ROM is stored in the form of a computer-readable program code, and the CPU sequentially executes an operation according to the program code.

1-5. Configuration of Discharge Stand

Figure 12:
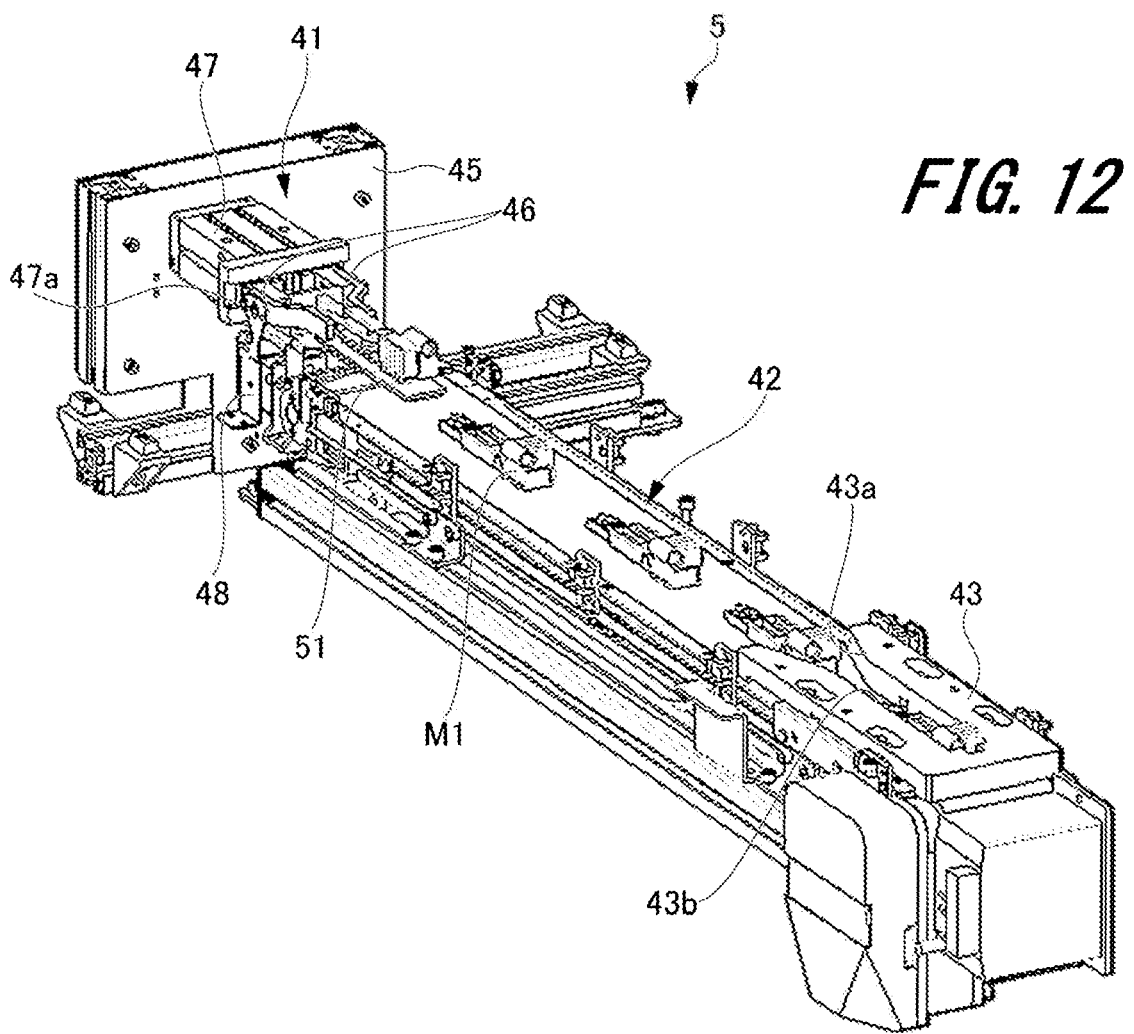
FIG. 12 is a perspective view illustrating a discharge stand of the component supply device according to the embodiment of the present invention.

Next, a detailed configuration of the discharge stand 5 will be described with reference to FIGS. 12 to 18. FIG. 12 is a perspective view illustrating the discharge stand 5, FIG. 13 is a side view illustrating the posture changer 41 of the discharge stand 5 described later, and FIG. 14 is a perspective view illustrating the posture changer 41.

Figure 13:
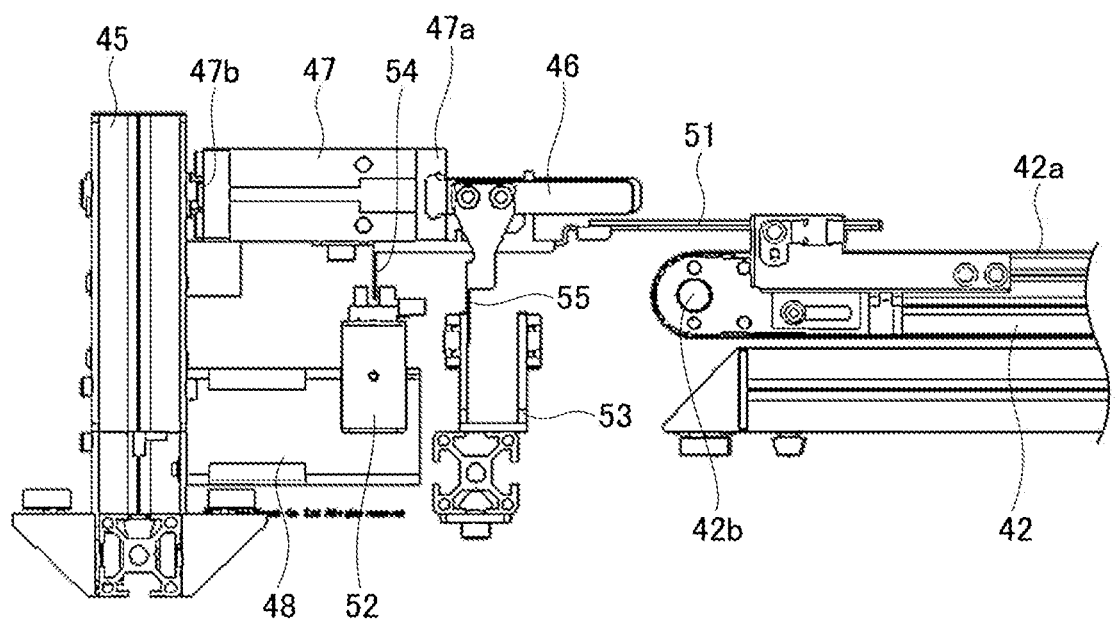
FIG. 13 is a side view illustrating a posture changer in the discharge stand of the component supply device according to the embodiment of the present invention.
Figure 14:
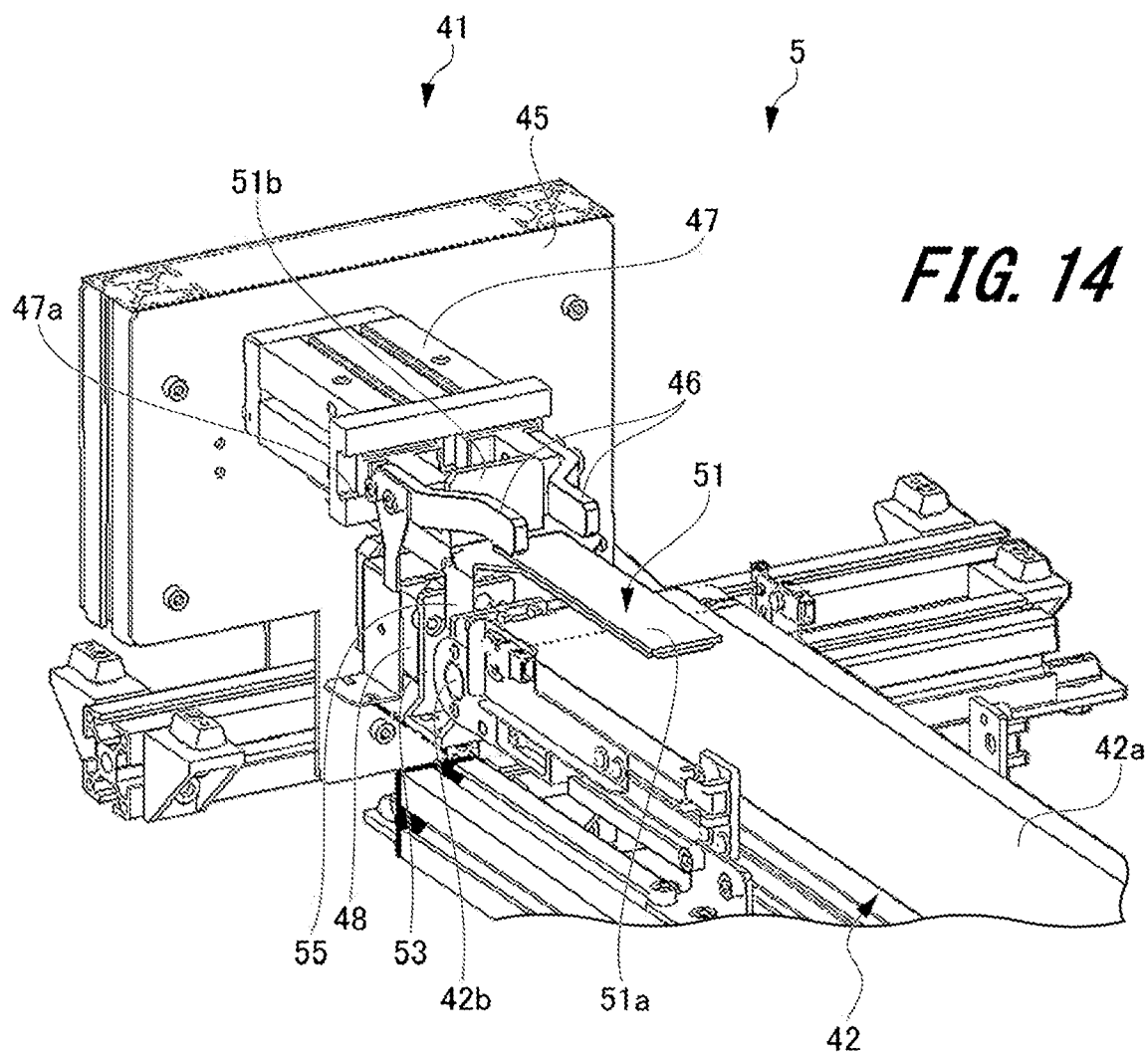
FIG. 14 is a perspective view illustrating the posture changer in the discharge stand of the component supply device according to the embodiment of the present invention.

As illustrated in FIGS. 12 to 14, the discharge stand 5 includes the posture changer 41, a conveyor 42, and a positioner 43. In the discharge stand 5, the posture changer 41, the conveyor 42, and the positioner 43 are arranged in this order from the upstream side along the component conveying direction.

The posture changer 41 changes the posture of a component conveyed from the conveyance robot 2 to a predetermined posture on the basis of the information captured by the image capturer 36. Then, the posture changer 41 supplies a component with the posture having been changed to a predetermined posture to the conveyor 42. Note that a detailed configuration of the posture changer 41 will be described later.

As illustrated in FIGS. 13 and 14, the conveyor 42 includes a conveyance belt 42a, a driving roller 42b, and a driven roller (not illustrated). The driving roller 42b and the driven roller are placed such that the axial directions thereof are parallel to a direction orthogonal to the conveyance direction. The driving roller 42b is placed on the upstream side in the conveyance direction, and the driven roller is placed on the downstream side in the conveyance direction.

The conveyance belt 42a is formed in an endless shape with both ends thereof in the longitudinal direction being connected. The conveyance belt 42a is stretched between the driving roller 42b and the driven roller. When the driving roller 42b is rotationally driven, the conveyance belt 42a circulates between the driving roller 42b and the driven roller. Accordingly, a component M1 placed on the conveyance belt 42a is conveyed. Besides, since the driving roller 42b rotates at a constant speed, the component M1 is conveyed to the discharge position at a predetermined speed and a constant speed.

The driving roller 42b and the driven roller are placed at an interval therebetween in the first direction X, and the conveyance belt 42a has a predetermined length in the first direction X. As a result, it is possible to secure an interval between the posture changer 41 and a discharge position set by a positioner 43 described later. That is, a buffer for the component supply operation can be secured by the conveyance belt 42a.

As illustrated in FIG. 12, the positioner 43 is placed at an end, of the conveyance belt 42a of the conveyor 42, on the downstream side in the conveyance direction. The positioner 43 is provided on the conveyance belt 42a. An end, of the positioner 43, on the upstream side in the conveyance direction is open.

The positioner 43 includes a guide 43a and a positioning groove 43b. The guide 43a is a groove formed so as to be continuous with the open end in the positioner 43. An interval between the wall surfaces facing each other in the guide 43a is continuously narrowed from the upstream side to the downstream side in the conveyance direction. The component M1 conveyed on the conveyance belt 42a by the conveyor 42 abuts on a wall surface of the guide 43a. The guide 43a guides the component M1 to a predetermined discharge position.

A positioning groove 43b is formed so as to be continuous to the downstream side of the guide 43a in the conveyance direction. The component M1 conveyed by the conveyor 42 and guided by the guide 43a is fitted into the positioning groove 43b. The position at which the positioning groove 43b is provided corresponds to the discharge position of the discharge stand 5 and the component supply device 1. As described above, by performing the positioning of the component M1 at the discharge position by the positioner 43, it is possible to efficiently hand over the component M1 to a process or a device on the downstream side of the component supply device 1. As a result, the work efficiency in a process or a device on the downstream side of the component supply device 1 can be improved.

The positioner 43 is attached to the conveyance belt 42a of the conveyor 42 in an attachable/detachable manner. In addition, there are a plurality of positioners 43 with the positioning grooves 43b and the guides 43a having different shapes according to the component to be conveyed. Then, a desired positioner 43 is attached to the conveyance belt 42a according to the component to be conveyed.

Next, a detailed configuration of the posture changer 41 will be described.

As illustrated in FIGS. 12 to 14, the posture changer 41 includes a base 45, two chucks 46, a rotating member 47, a rotation driving unit 48, a reception stand 51, a first sensor 52, and a second sensor 53.

The base 45 is placed on the upstream side of the conveyor 42 in the conveyance direction. One surface of the base 45 on the downstream side in the conveyance direction faces the conveyor 42. The rotating member 47 is provided with a rotating shaft 47b on one surface of the base 45 on the downstream side in the conveyance direction. The rotating member 47 is rotatably supported by the rotating shaft 47b. The rotating member 47 projects from the base 45 toward the downstream side in the conveyance direction. In addition, the base 45 is provided with a rotation driving unit 48 that rotationally drives the rotating member 47 and the first sensor 52.

The chuck support 47a is provided at a distal end of the rotating member 47 on the downstream side in the conveyance direction. The two chucks 46 are supported on the chuck support 47a so as to be approachable and separable. The two chucks 46 approach each other and separate from each other by a driving unit (not illustrated) provided in the rotating member 47. As a result, the two chucks 46 grip and release the component M1 placed on the reception stand 51.

A second detection piece 55 is attached to the chuck 46. The second detection piece 55 projects downward in the vertical direction from the chuck 46. The second detection piece 55 is detected by the second sensor 53 provided in the vicinity of the first sensor 52. Then, the second sensor 53 detects the opening/closing interval of the two chucks 46 and the rotation angle of the chuck 46 while detecting the second detection piece 55.

The reception stand 51 is fixed to the rotating member 47. As illustrated in FIG. 14, the reception stand 51 includes a reception surface 51a and a rear end 51b. The rear end 51b is placed on the chuck support 47a of the rotating member 47. The rear end 51b is placed between the two chucks 46.

The reception surface 51a projects from the rotating member 47 toward the downstream side in the conveyance direction. The reception surface 51a is placed in an upper section in the vertical direction at an end, of the conveyance belt 42a, on the upstream side in the conveyance direction. The reception surface 51a is placed, between the two chucks 46, downward in the vertical direction of the two chucks 46. The component M1 conveyed from the conveyance robot 2 is placed on the reception surface 51a.

The reception surface 51a is placed parallel to the horizontal direction. The reception surface 51a may have an end on the upstream side in the conveyance direction inclined downward in the vertical direction. As a result, the component M1 placed on the reception surface 51a moves toward the rear end 51b side due to the inclination of the reception surface 51a. Then, once the component M1 abuts on the rear end 51b, it becomes possible to eliminate the variation in positions gripped by the two chucks 46.

Then, the two chucks 46 and the reception stand 51 rotate about the rotating shaft 47b together with the rotating member 47.

The rotating member 47 is provided with a first detection piece 54. The first detection piece 54 is fixed to a lower surface of the rotating member 47 in the vertical direction. The first detection piece 54 projects downward in the vertical direction from the rotating member 47. The first detection piece 54 is detected by the first sensor 52. The first sensor 52 detects the first detection piece 54, thereby detecting that the rotating member 47 is in a reception state illustrated in FIGS. 13 and 14, that is, the reception surface 51a of the reception stand 51 is directed upward in the vertical direction.

As illustrated in FIGS. 2 and 3, the reception surface 51a of the reception stand 51 corresponds to the hand-over position Q4. As illustrated in FIG. 3, the height of the reception stand 51 in the third direction Z is substantially equal to the height of the tray 11 of the pick-up stand 4.

Next, an operation example of the posture changer 41 will be described with reference to FIGS. 14 to 18. FIGS. 14 to 18 are perspective views illustrating an operation example of the posture changer 41. In the operation example illustrated in FIGS. 14 to 18, the component M1 is handed over from the conveyance robot 2 in a state where the component M1 is placed in a transverse manner, that is, the upper surface of the component M1 faces in the horizontal direction.

First, as illustrated in FIG. 14, when receiving the component M1, the posture changer 41 rotates the rotating member 47 so that the reception surface 51a of the reception stand 51 faces upward in the vertical direction on the basis of information detected by the first sensor 52 (see FIG. 3). At this time, the two chucks 46 are separated from each other, that is, are open. A state of the rotating member 47, the chucks 46, and the reception stand 51 illustrated in FIG. 14 is referred to as a reception state.

Figure 15:
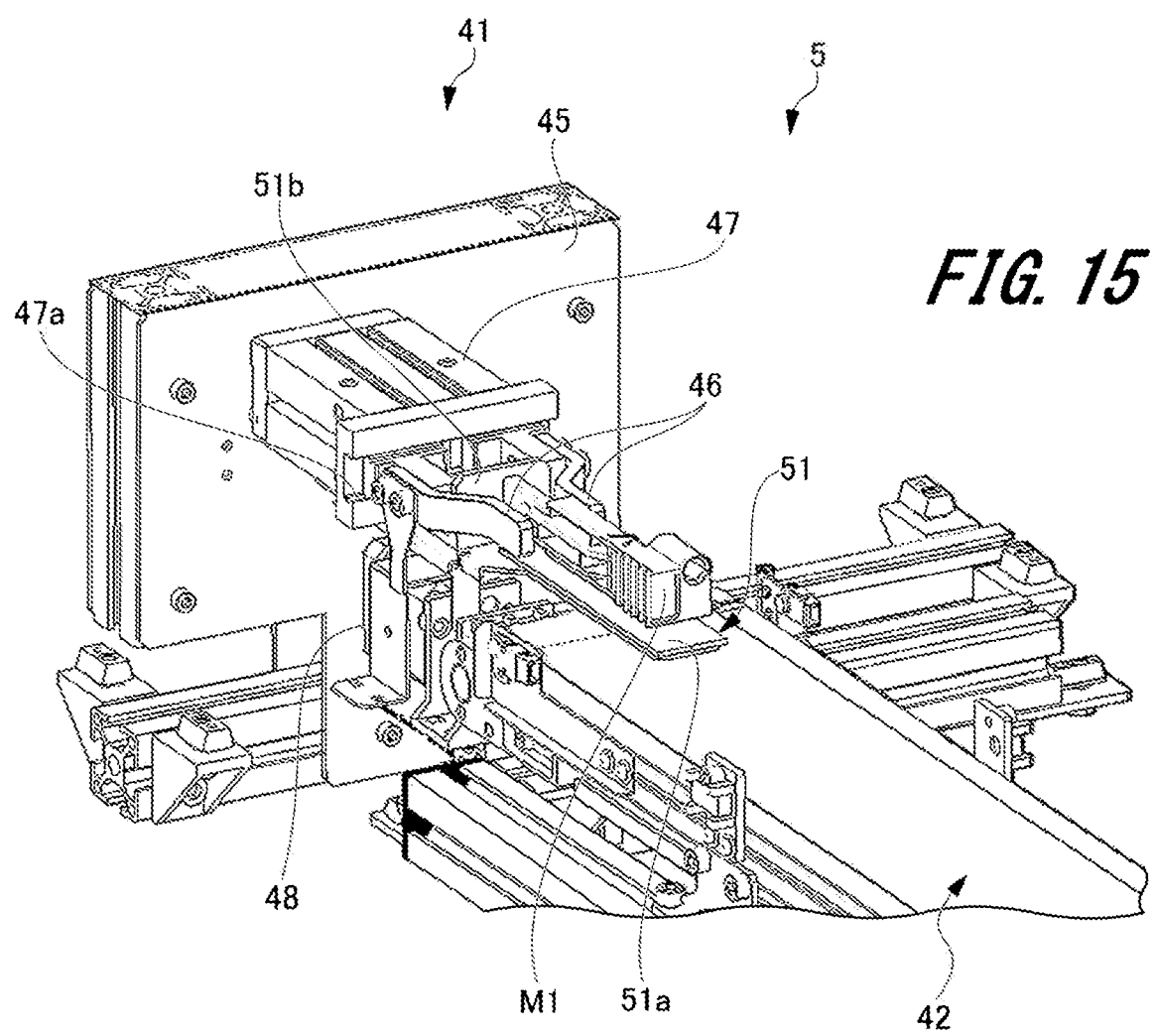
FIG. 15 is a perspective view illustrating an operation example of the posture changer of the component supply device according to the embodiment of the present invention.

Next, as illustrated in FIG. 15, the conveyance robot 2 places the component M1 on the reception surface 51a of the reception stand 51. Then, the posture changer 41 brings the two chucks 46 close to each other and grips the component M1 placed on the reception stand 51 with the two chucks 46.

Figure 16:
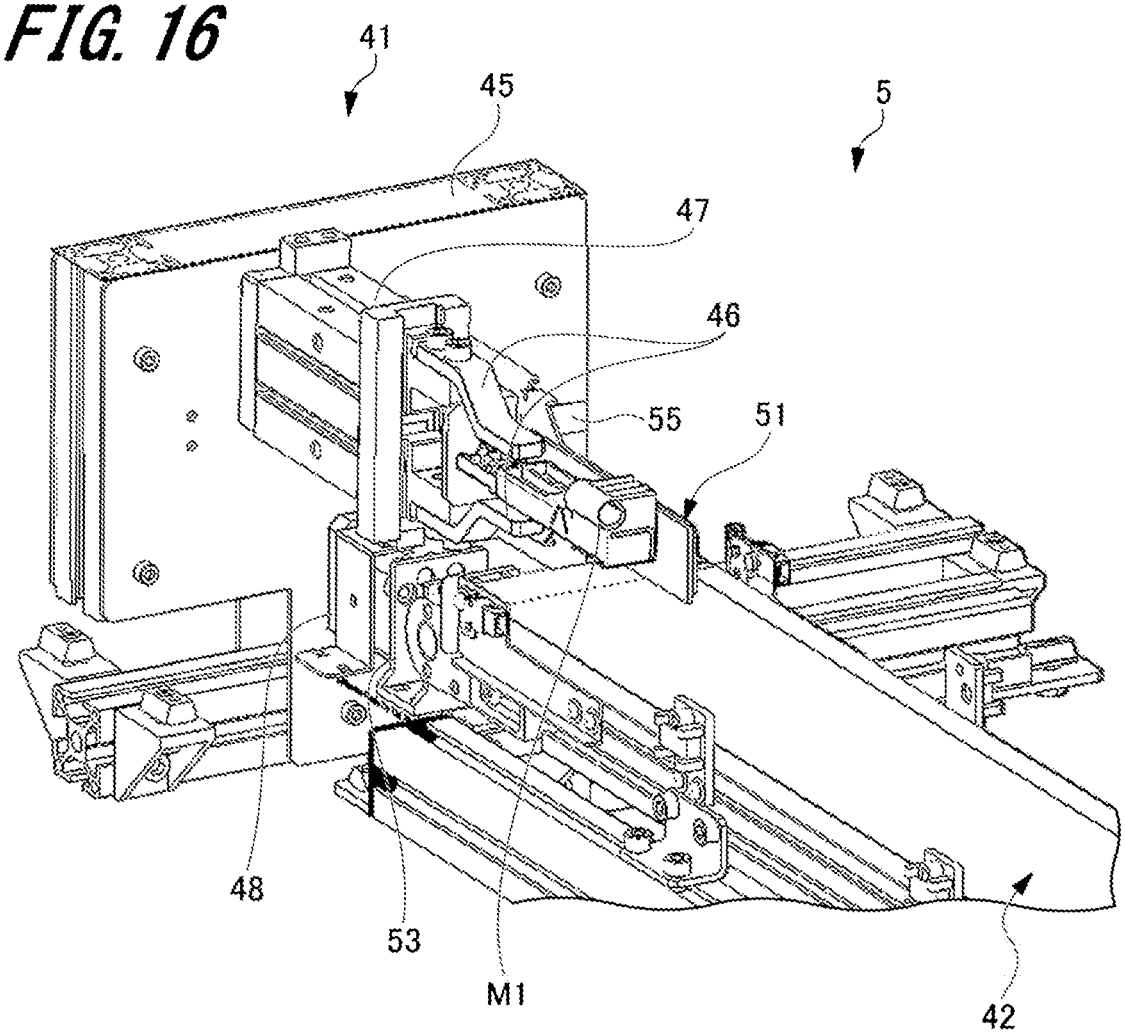
FIG. 16 is a perspective view illustrating an operation example of the posture changer of the component supply device according to the embodiment of the present invention.

Next, as illustrated in FIG. 16, the posture changer 41 drives the rotation driving unit 48 to rotate the rotating member 47 by 90 degrees. As a result, the upper surface of the component M1 faces upward in the vertical direction, and the posture of the component M1 is changed to the correct posture. At this time, the component M1 is gripped by the two chucks 46. Therefore, when the rotating member 47 performs a rotating operation, it is possible to prevent the component M1 from unintentionally falling from the reception stand 51.

Figure 17:
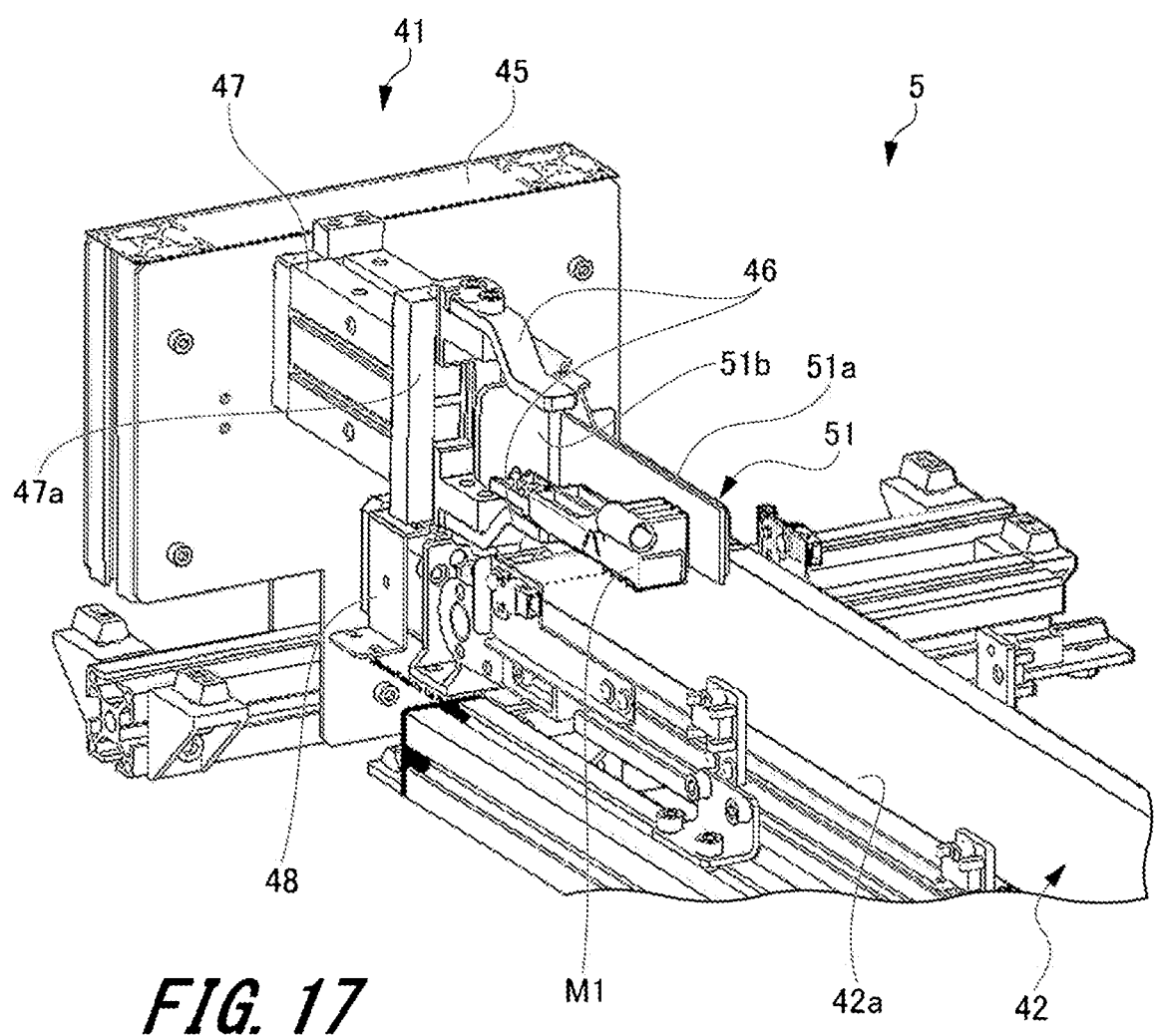
FIG. 17 is a perspective view illustrating an operation example of the posture changer of the component supply device according to the embodiment of the present invention.

When the component M1 is changed to the correct posture, as illustrated in FIG. 17, the posture changer 41 separates, that is, opens the two chucks 46 so as to release the gripping of the component M1. As described above, the reception surface Ma of the reception stand 51 is placed above the conveyance belt 42a of the conveyor 42 in the vertical direction. Therefore, once the gripping of the chucks 46 is released, the component M1 is placed on the conveyance belt 42a from the reception stand 51.

Figure 18:
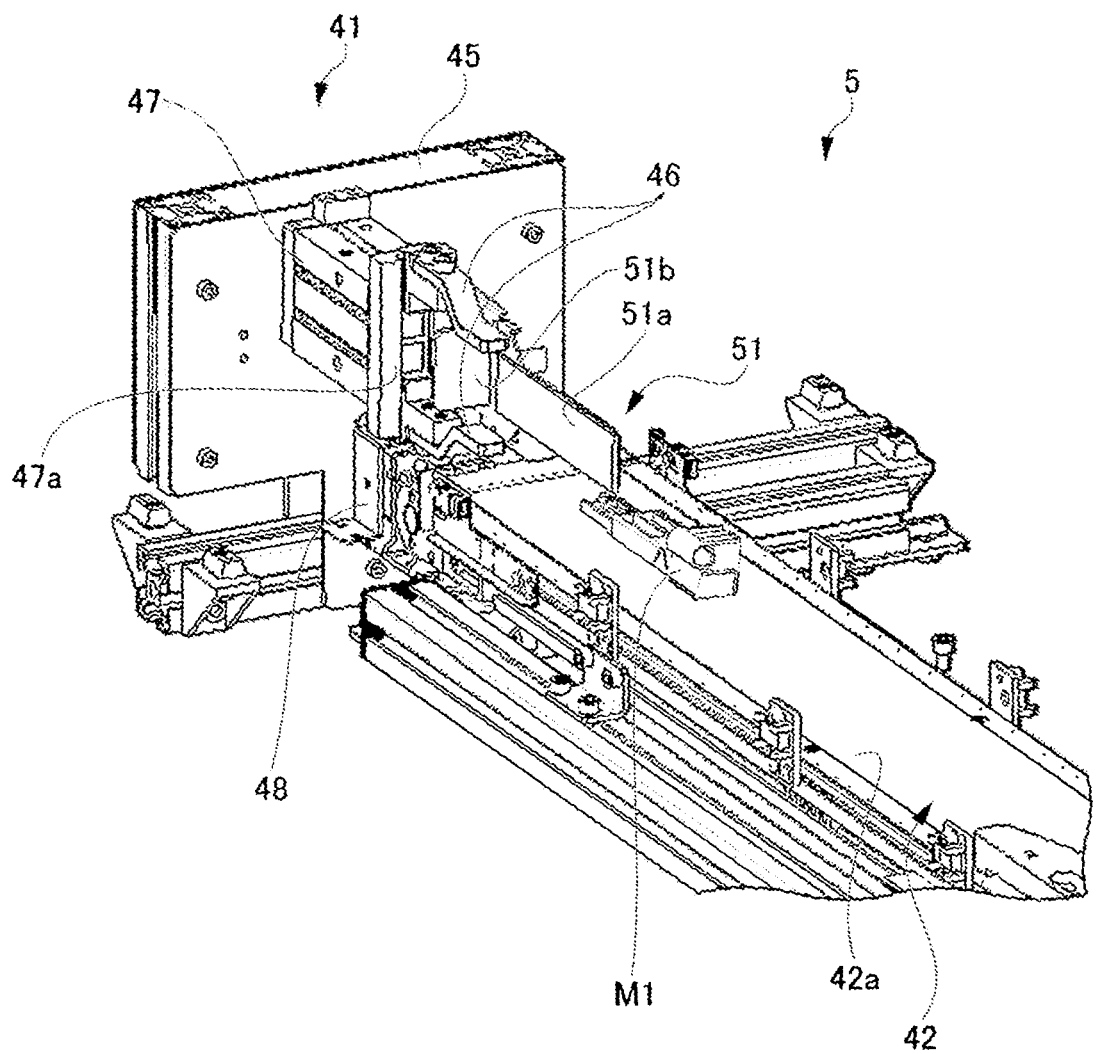
FIG. 18 is a perspective view illustrating an operation example of the posture changer of the component supply device according to the embodiment of the present invention.

When the component M1 is placed on the conveyance belt 42a, the conveyor 42 drives the driving roller 42b. As a result, as illustrated in FIG. 18, the component M1 placed on the conveyance belt 42a is conveyed toward the downstream side in the conveyance direction.

When the component M1 is supplied to the conveyor 42, the posture changer 41 drives the rotation driving unit 48 to return the rotating member 47, the chucks 46, and the reception stand 51 to the reception state illustrated in FIG. 14.

2. Operation Example of Component Supply Device

Next, an operation example of the component supply device 1 having the abovementioned configuration, that is, a component supply operation will be described with reference to FIGS. 19 and 20. FIG. 19 explains a component supply operation of the component supply device 1.

As illustrated in FIG. 19, in order for the component supply device 1 to supply components to a device in a subsequent process, firstly, the components are housed in the hopper 3 (step S101). The components may be housed in the hopper 3 by a device in a preceding process or by a person. The components are housed in the hopper 3 through a supply port 73 (FIG. 22) of a safety fence 10 described later. Then, the components are loaded in bulk in the storage container 22 of the hopper 3.

Next, the gripper 35 of the conveyance robot 2 grips one or more components from a large number of components in the storage container 22 of the hopper 3 (step S102). In the operation of step S102, firstly, as illustrated in FIGS. 7 and 9, the driving unit 29 of the hopper 3 is driven to raise the push-up 24 to a predetermined height. Consequently, the components stored in the storage container 22 of the hopper 3 are pushed up to the supply position Q2 by the recess 24a of the push-up 24. The gripper 35 of the conveyance robot 2 grips the components housed in the recess 24a.

Next, the conveyance robot 2 conveys the components to the tray 11 of the pick-up stand 4. Here, as illustrated in FIG. 3, since the heights of the supply position Q2 and the temporary placement position Q3 are set to be substantially equal to each other, it is possible to reduce the deviation of the hand 34 in the conveyance robot 2 in the third direction Z, that is, the height direction. Consequently, it is possible to reduce the number of rotation operations of the plurality of arms 33 in the conveyance robot 2, thereby reducing the time required for changing the posture of the conveyance robot 2.

After being conveyed to the pick-up stand 4, the conveyance robot 2 supplies a component to the pick-up stand 4 (step S103). At this time, the conveyance robot 2 performs a supply operation such that the gripped components become dispersed on the pick-up stand 4. Hereinafter, the supply operation which causes components to be dispersed on the pick-up stand 4 is referred to as the "component dispersion operation". In the component dispersion operation, the conveyance robot 2 drops components from a predetermined height in the third direction Z to the tray 11 of the pick-up stand 4 in order to supply the components. Accordingly, it is possible to prevent the components from being dispersed on the tray 11 and interfering with each other. Here, the height at which components are dropped onto the tray 11 is changed according to the components to be supplied.

Next, the image capturer 36 in the conveyance robot 2 captures an image of a surface of the tray 11 in the pick-up stand 4, and the controller recognizes the surface on the tray 11 through a bird's-eye view (step S104). The detailed operation of step S104 will be described later. At this time, the controller determines whether there is a grippable component on the tray 11. When it is determined that there is no grippable component on the tray 11, the processing returns to step S102, and the conveyance robot 2 grips one or more components from a large number of components in the hopper 3.

Note that, even if there is a component on the tray 11, if the component is placed at a position where the conveyance robot 2 cannot grip it, it is determined that there is no grippable component on the tray 11. In this case, the controller drives the movable mechanism 14 to incline the tray 11. Thus, the components placed on the tray 11 fall from the tray 11 through the opening having no wall surface 11b and are collected in the storage container 22 of the hopper 3. The collection operation is performed during a supply operation (place operation), to be described later, performed by the conveyance robot 2 to the discharge stand 5.

Furthermore, the components collected in the storage container 22 slide down along the inclined surface 22c to the bottom surface of the storage container 22. Therefore, providing the inclined surface 22c in the storage container 22 secures a space for collecting a component.

When it is determined that there is a grippable component on the tray 11, the controller recognizes (determines) a gripping position at which one of the components on the tray 11 is gripped (step S105). The detailed operation of step S105 will be described later. Then, the conveyance robot 2 grips one component (step S106) and transfers the component to the reception stand 51 of the discharge stand 5, that is, the hand-over position Q4.

In addition, the conveyance robot 2 transfers the gripped component without changing the posture thereof, and hands over the component to the reception stand 51 (step S107). This eliminates the need to change the posture of the conveyance robot 2 according to the posture of the component placed on the pick-up stand 4. Consequently, it is possible to simplify the operation of the conveyance robot 2, and reduce the time required for changing the posture of the conveyance robot 2. When the conveyance robot 2 transfers one component to the discharge stand 5, the controller recognizes (determines) a gripping position of a component to be gripped next from among the plurality of components on the pick-up stand 4.

As illustrated in FIG. 3, since the heights of the temporary placement position Q3 and the hand-over position Q4 are set to be substantially equal to each other, it is possible to reduce the deviation of the hand 34 in the conveyance robot 2 in the third direction Z, that is, the height direction. Consequently, it is possible to reduce the number of rotation operations of the plurality of arms 33 in the conveyance robot 2, thereby reducing the time required for changing the posture of the conveyance robot 2.

When the conveyance robot 2 places a component on the reception stand 51 of the discharge stand 5, the posture changer 41 grips the component with the chuck 46. Then, the posture changer 41 rotates the rotating member 47 on the basis of information pertaining to the posture of the component received from the controller, and changes the posture of the component to a predetermined posture (step S108). Then, the posture changer 41 supplies the component to the conveyor 42 once the posture of the component is changed. Then, the conveyor 42 conveys the component to the positioner 43, and positions the component by use of the positioner 43. As a result, the component supply operation to a downstream-side process or device in the component supply device 1 is completed.

During the processing in step S108, that is, while the posture changer 41 changes the posture of the component, the conveyance robot 2 moves from the discharge stand 5 to the pick-up stand 4. As described above, according to the component supply device 1 of the present example, since it is not necessary to change the posture the component by the conveyance robot 2, once the conveyance operation to the hand-over position Q4 is completed, the conveyance robot 2 can immediately move to the supply position Q2 or the temporary placement position Q3. Consequently, the time required for the component supply operation in the component supply device 1 can be shortened.

Furthermore, by arranging the supply position Q2, the temporary placement position Q3, and the hand-over position Q4 on a straight line, the movement path of the hand 34 that grips the component in the conveyance robot 2 can be made to be a straight line. Consequently, the conveyance distance of the component to be conveyed by the conveyance robot 2 can be shortened. It is possible to shorten the time required for conveying the component in the conveyance robot 2. As a result, the time required for conveying the component in the component supply device 1 can be shortened.

When there is no component on the pick-up stand 4 after the processing in step S107, the operation of supplying components to the discharge stand 5 is terminated. Next, the conveyance robot 2 grips one or more components from among a large number of components in the hopper 3, and places it flat on the pick-up stand 4.

Next, detailed operations of steps S104 and S105 will be described with reference to FIG. 20. FIG. 20 is a flowchart illustrating the component recognition operation.

As shown in FIG. 20, first, the controller drives the arm 33 of the conveyance robot 2 to move the hand 34 of the conveyance robot 2 to a photographing position for bird's-eye view recognition (step S11). Next, the image capturer 36 of the conveyance robot 2 performs photographing (step S12). Note that, during the processing of step S12, the entire pick-up stand 4, that is, the entire tray 11 falls within the angular field of the image capturer 36.

Next, the controller performs image processing on the image taken by the image capturer 36 (step S13). Then, the controller extracts a component to be gripped, that is, a pick-up target candidate, on the basis of the image data on which the image processing has been performed (step S14). The target candidate extraction processing is performed by determining a component from image data from a threshold based on an area of the component stored in advance.

Subsequently, on the basis of the data extracted in step S14, the controller determines interference between a component and a component or between a component and a wall surface 11b of the pick-up stand 4 (step S15). Then, on the basis of the interference determination in step S15, the controller determines the order of the conveyance performed by the conveyance robot 2 from the pick-up stand 4 to the discharge stand 5 (step S16).

The abovementioned processing from step S11 to step S16 corresponds to the bird's-eye view recognition processing (step S104) illustrated in FIG. 19.

Once the bird's-eye view recognition processing is terminated, the controller moves the hand 34 to the photographing position of the gripping position recognition such that the center of gravity of the component is located at the center of the angular field of the image capturer 36 (step S21). Then, the controller causes the image capturer 36 of the conveyance robot 2 to perform photographing (step S22). Next, the controller performs image processing on the image taken by the image capturer 36 (step S23). Then, the controller estimates the gripping position on the component and the posture of the component on the basis of the image data on which the image processing has been performed (step S24). Through the processing from step S21 to step S24, the component gripping position recognition processing illustrated in FIG. 19 is terminated.

Note that the information pertaining to the posture of the component estimated in the processing of step S24 is transmitted to the posture changer 41 of the discharge stand 5. Then, the posture changer 41 performs the processing of step S108 illustrated in FIG. 19, that is, the posture changing operation of the component on the basis of the received information.

3. Comparison

Next, a difference in conveyance distance between a conventional component supply device and the component supply device of the present example will be described with reference to FIGS. 21A and 21B.

Figure 21A:
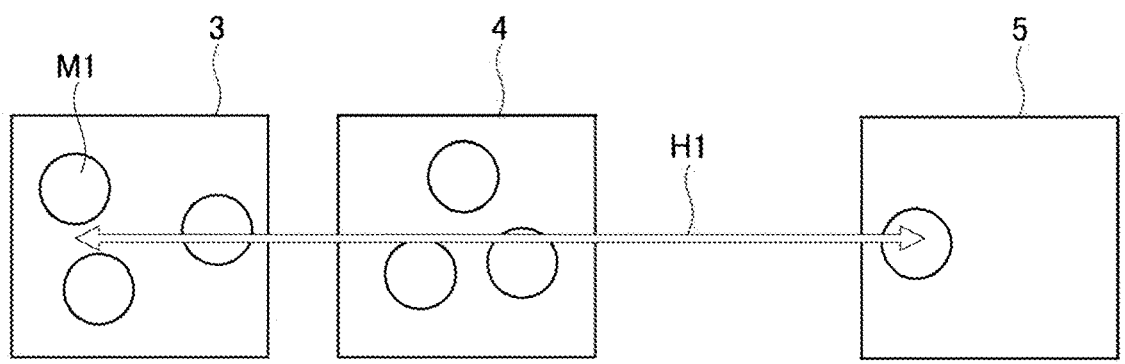
FIG. 21A is an explanatory drawing illustrating a difference in conveyance distance between the component supply device according to the embodiment of the present invention, and a conventional component supply device.
Figure 21B:
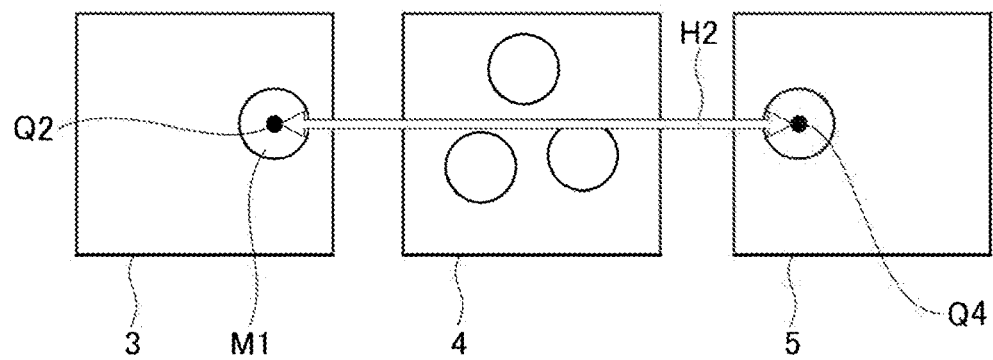
FIG. 21B is an explanatory drawing illustrating a difference in conveyance distance between the component supply device according to the embodiment of the present invention, and a conventional component supply device.

FIGS. 21A and 21B are explanatory drawings illustrating a difference in conveyance distance between the conventional component supply device and the component supply device 1 of the present example: FIG. 21A is an explanatory diagram illustrating the conveyance distance of the conventional component supply device, and FIG. 21B is an explanatory diagram illustrating the conveyance distance of the component supply device 1 of the present example.

In the conventional component supply device, the conveyance robot 2 changes the posture of the component M1 when the component M1 is conveyed from the pick-up stand 4 to the discharge stand 5. It is necessary to secure a movable range for changing the posture of the conveyance robot 2, and it is necessary to widen an interval between the pick-up stand 4 and the discharge stand 5 as illustrated in FIG. 21A.

On the other hand, in the component supply device 1 of the present example, since the posture of the component M1 is changed by the posture changer 41 provided on the discharge stand 5, the posture of the conveyance robot 2 during the conveyance from the pick-up stand 4 to the discharge stand 5 is fixed. Since a movable range for changing the posture of the conveyance robot 2 is no longer required, it is possible to reduce an interval between the pick-up stand 4 and the discharge stand 5 as illustrated in FIG. 21B. As a result, as shown in FIGS. 21A and 21B, the conveyance distance H2 of the component M1 in the conveyance robot 2 in the component supply device 1 of the present example can be made shorter than the conveyance distance H1 of the component M1 in the conveyance robot 2 of the conventional component supply device.

Furthermore, in the conventional component supply device, the position at which the component M1 is supplied from the hopper 3 to the conveyance robot 2, is not fixed. Therefore, in the conventional component supply device, it is necessary for the conveyance robot 2 to change its posture according to the state of the components stored in the hopper 3.

On the other hand, in the component supply device 1 of the present example, the position (supply position Q2) at which the component M1 is supplied from the hopper 3 to the conveyance robot 2 is fixed to the position at which the recess 24a of the push-up 24 is provided. As a result, in the component supply device 1 of the present example, the conveyance robot 2 can grip the component M1 from the predetermined supply position Q2 without changing its posture.

As described above, in the component supply device 1 of the present example, it is possible to shorten the conveyance distance of the component M1 in the conveyance robot 2, and minimize the posture changing operation of the conveyance robot 2. As a result, the operation time of the conveyance robot 2 can be shortened, and the time required for conveying the component in the component supply device 1 can be shortened.

4. Configuration Example of Safety Fence

Figure 22:
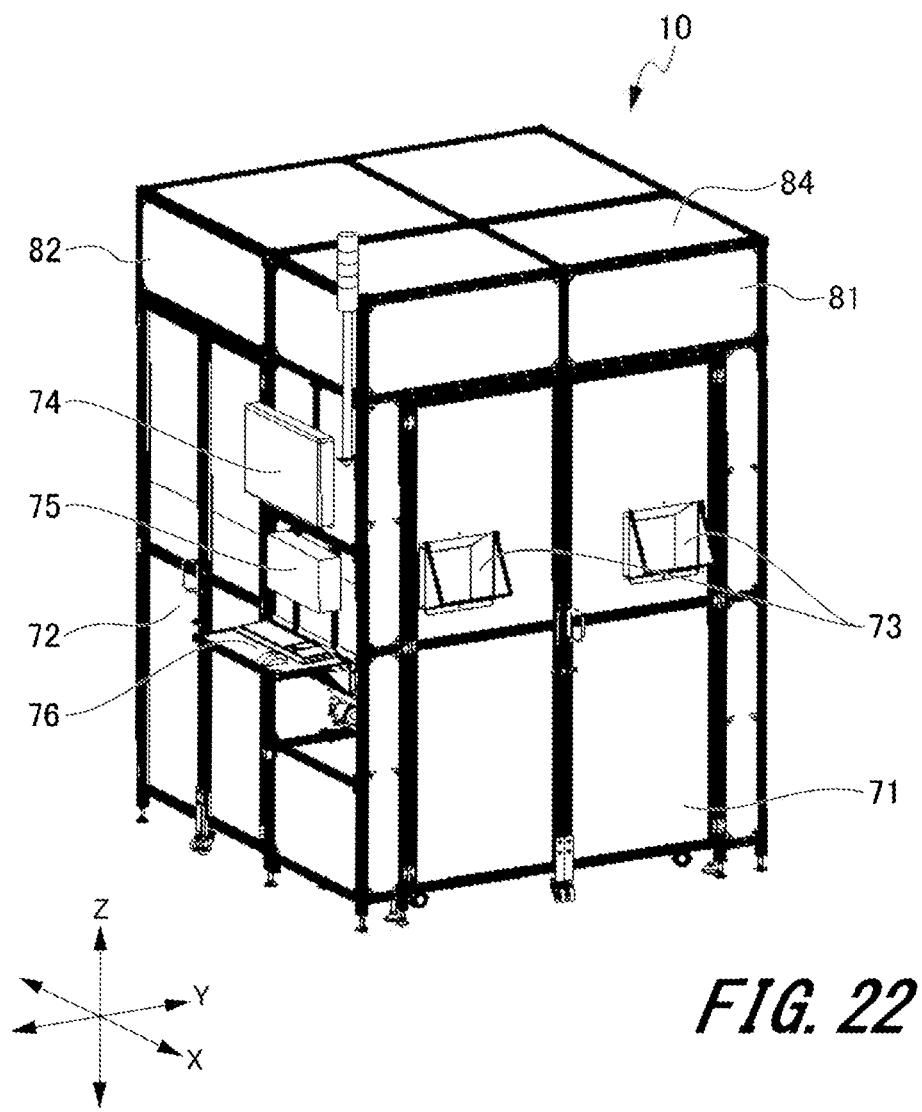
FIG. 22 is a perspective view illustrating a safety fence of the component supply device according to the embodiment of the present invention.
Figure 23:
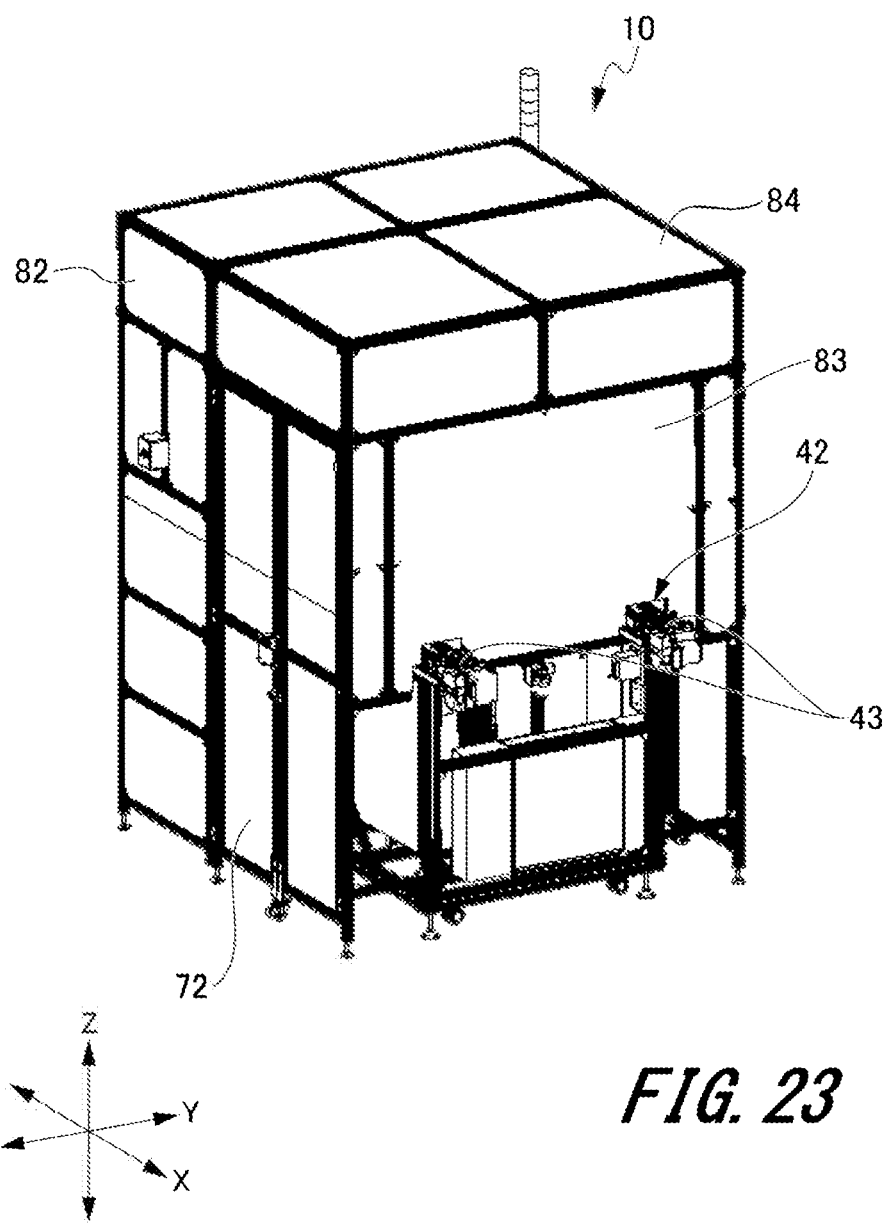
FIG. 23 is a perspective view illustrating the safety fence of the component supply device according to the embodiment of the present invention when viewed from a side opposite to that in FIG. 22.

The component supply device 1 having the abovementioned configuration is covered by a safety fence 10 described below. Next, a configuration of the safety fence 10 will be described with reference to FIGS. 22 and 23. FIGS. 22 and 23 are perspective views illustrating the safety fence 10.

As illustrated in FIGS. 22 and 23, the safety fence 10 includes a front panel 81, a back panel 83, two side panels 82, and a ceiling panel 84. The front panel 81, the back panel 83, the two side panels 82, and the ceiling panel 84 are formed by a flat plate member having a substantially rectangular shape.

The front panel 81 is placed at one end in the first direction X, and the back panel 83 is placed at the other end in the first direction X. The front panel 81 and the back panel 83 face each other in the first direction X. The two side panels 82 are placed at both ends in the second direction Y so as to face each other. The ceiling panel 84 is placed at an upper end in the third direction Z, that is, the upper end in the vertical direction, of the front panel 81, the back panel 83, and the two side panels 82. The front panel 81, the back panel 83, the two side panels 82, and the ceiling panel 84 cover the component supply device 1 described above.

The back panel 83 covers an upper section of the component supply device 1 in the third direction Z, that is, an upper section in the vertical direction. A lower section of the back panel 83 in the third direction Z is open, and the positioner 43 of the conveyor 42 in the discharge stand 5 is exposed from the back panel 83. As a result, a component conveyed to the positioner 43 which corresponds to the discharge position can be discharged to a downstream-side process or device with respect to the component supply device 1. In addition, a replacement work of the positioner 43 can be easily performed.

The front panel 81, the back panel 83, the two side panels 82, and the ceiling panel 84 are formed by a member having a light shielding property, or have a light shielding sheet attached thereto. As a result, it is possible to prevent ambient light from entering the inside of the safety fence 10. As a result, the image capturer 36 of the conveyance robot 2 can photograph the component without being affected by ambient light, thereby improving the recognition accuracy of the component.

The front panel 81, the back panel 83, the two side panels 82, and the ceiling panel 84 may not have a light shielding property over the entire surfaces, and a part thereof may be transparent or translucent. At least only the periphery of the pick-up stand 4 needs to have a light shielding property. Thus, by partially making the front panel 81, the back panel 83, the two side panels 82, and the ceiling panel 84 transparent or translucent, it is possible to allow a state of the inside of the safety fence 10 to be easily visually recognized from the outside.

Furthermore, by covering the entire component supply device 1 by the safety fence 10, it is possible to suppress the leakage of the operation sound of the component supply device 1 to the outside. As a result, it is possible to achieve the high noise reduction of the component supply device 1. Note that a sound absorbing material may be provided on the inner surfaces of the front panel 81, the back panel 83, the two side panels 82, and the ceiling panel 84.

The front panel 81 is provided with a first opening/closing door 71 and two supply ports 73. The first opening/closing door 71 is attached to the front panel 81 in an openable and closable manner. Then, an operator can access the hopper 3 covered by the safety fence 10 by opening the first opening/closing door 71. The first opening/closing door 71 is provided with the two supply ports 73.

The two supply ports 73 are arranged at positions corresponding to the storage container 22 of the first hopper 3A and the storage container 22 of the second hopper 3B. The supply ports 73 are placed in an upper section in the third direction Z in the storage container 22 of the hopper 3. The supply ports 73 are connected to the opening in the storage container 22 in the third direction Z. It is possible to supply the components to the storage container 22 from the outside of the safety fence 10 via the supply ports 73. As a result, the storage container 22 can be refilled with the components without stopping the component supply operation of the component supply device 1.

The side panel 82 is provided with a second opening/closing door 72. The second opening/closing door 72 is provided on the other end side, in the first direction X, of the side panel 82, and is disposed at a position corresponding to the pick-up stand 4, the conveyance robot 2, and the discharge stand 5. Then, an operator can access the conveyance robot 2 and the discharge stand 5, and the pick-up stand 4 covered by the safety fence 10, by opening the second opening/closing door 72. As a result, it becomes possible to collect the components remaining on the conveyance belt 42a in the discharge stand 5.

The first opening/closing door 71 and the second opening/closing door 72 are provided with an opening/closing detector that detects opening/closing. When detecting the opening of the first opening/closing door 71 or the second opening/closing door 72, the opening/closing detector outputs opening information to the controller of the component supply device 1. Then, when receiving the opening information, the controller urgently stops the operation of the entire component supply device 1. This makes it possible to provide the component supply device 1 excellent in safety.

Note that, when only the first opening/closing door 71 is open, the controller may not stop the conveyor 42 of the discharge stand 5. As a result, it becomes possible to continue the component conveyance operation in the conveyor 42, thereby allowing the component supply device 1 to continue the supply operation to a downstream-side process or device.

Either one of the two side panels 82 and 82 is provided with a display unit 74, a manipulation switch 75, and a manipulation unit 76. The display unit 74 is configured by, for example, a display such as a liquid crystal display (LCD) or an organic electro luminescence display (ELD). The display unit 74 displays an image captured by the image capturer 36 of the conveyance robot 2 and various types of information pertaining to the component supply device 1. Furthermore, the display unit 74 may be configured by a touch panel in which a touch sensor as a manipulation input unit is equipped over a display.

The manipulation switch 75 is provided in a lower section in the third direction Z with respect to the display unit 74. The manipulation switch 75 is provided with various switches and buttons such as an emergency stop button for emergently stopping the component supply device 1 and an operation start switch for the component supply device 1. Accordingly, since the operation related to the manipulation of the component supply device 1 can be performed through a switch or a button, the component supply device 1 can be manipulated without being affected by the level of an operator's skill.

The manipulation unit 76 is provided in a lower section in the third direction Z with respect to the manipulation switch 75. Examples of the manipulation unit 76 includes a keyboard, a mouse, and the like. Various types of information for operating the component supply device 1 are inputted by an operator through the manipulation unit 76.

As described above, by providing the manipulation switch 75 and the manipulation unit 76 for manipulating the component supply device 1 in the safety fence 10, an operator can manipulate the component supply device 1 without entering the inside of the safety fence 10, and thus, it is possible to provide the component supply device 1 excellent in safety.

Note that the emergency stop button may be provided not only on one of the two side panels 82 and 82, but also on both of the side panels 82 and 82.

The embodiment has been described above with the functions and effects thereof. However, the present invention is not limited to the abovementioned embodiment, and various modifications can be made without departing from the gist of the invention set forth in the claims.

In the present specification, although terms such as "parallel" and "orthogonal" are used, these terms do not strictly mean only "parallel" and "orthogonal", but may represent a state of being "substantially parallel" or "substantially orthogonal" including "parallel" and "orthogonal" and falling within a range in which the function thereof can be exhibited.

Although embodiments of the present invention have been described and illustrated in detail, the disclosed embodiments are made for purposes of illustration and example only and not limitation. The scope of the present invention should be interpreted by terms of the appended claims.

DESCRIPTION OF REFERENCE NUMERALS

1 . . . component supply device
2 . . . conveyance robot
3, 3A, 3B . . . hopper
4, 4A, 4B . . . pick-up stand
5, 5A, 5B . . . discharge stand
7 . . . first frame
8 . . . second frame
10 . . . safety fence
11 . . . tray
11a . . . placement surface
11b . . . wall surface
12 . . . support
13 . . . rotating shaft
14 . . . movable mechanism
21 . . . support stand
22 . . . storage container
22a . . . side surface
22b . . . hoisting path
22c . . . inclined surface
22d . . . collection shutter
22e . . . collection path
23 . . . collection unit
24 . . . push-up
24a . . . recess
28 . . . upper surface detection sensor
29 . . . driving unit
29a . . . driving motor
29b . . . driving chain
31 . . . base stand
32 . . . rotating portion
33 . . . arm
34 . . . hand
35 . . . gripper
36 . . . image capturer
41 . . . posture changer
42 . . . conveyor
42a . . . conveyance belt
42b . . . driving roller
43 . . . positioner
43a . . . guide
43b . . . positioning groove
45 . . . base
46 . . . chuck
47 . . . rotating member
47a . . . chuck support
47b . . . rotating shaft
48 . . . rotation driving unit
51 . . . reception stand
51a . . . chamfered surface
51b . . . rear end
52 . . . first sensor
53 . . . second sensor
54 . . . first detection piece
55 . . . second detection piece
71 . . . first opening/closing door
72 . . . second opening/closing door
73 . . . supply port
74 . . . display unit
75 . . . manipulation switch
76 . . . manipulation unit
81 . . . front panel
82 . . . side panel
83 . . . back panel
84 . . . ceiling panel
H1, H2 . . . conveyance distance M1 . . . component
Q1 . . . rotation center
Q2 . . . supply position
Q3 . . . temporary placement position (flat placement position)
Q4 . . . hand-over position

The invention claimed is:

1. A component supply device comprising:
   a hopper having a box-shaped storage container in which bulk components are provided at a supply position;
   a conveyance robot configured to grip, convey and place a that component;
   a pick-up stand having a planar tray on which a component picked up and conveyed from the supply position by the conveyance robot is placed at a temporary placement position; and
   a discharge stand at a hand-over position to which the component is placed by the conveyance robot after being picked up and conveyed by the conveyance robot from the temporary placement position on the tray, wherein:
   the temporary placement position is downstream from the supply position;
   the hand-over position is downstream from the temporary placement position;
   the supply position, the temporary placement position and the hand-over position are all arranged in a straight line; and
   the discharge stand includes a posture changer that changes a posture of the component placed at the hand-over position.

2. The component supply device according to claim 1, wherein
   the conveyance robot includes an image capturer that captures an image of the component placed on the tray at the temporary placement position, and the posture changer changes a posture of the component based on information captured by the image capturer.

3. The component supply device according to claim 1, wherein
   the posture changer includes:
   a reception stand on which the component is placed; and
   a base that rotatably supports the reception stand, and
   the reception stand serves as the hand-over position.

4. The component supply device according to claim 3, wherein
   the posture changer includes:
   a chuck that grips the component placed on the reception stand; and
   a rotating member provided with the reception stand and the chuck, and
   the base rotatably supports the rotating member via a rotating shaft.

5. The component supply device according to claim 4, wherein
   the posture changer includes a sensor that detects states of the rotating member and the reception stand.

6. The component supply device according to claim 1, wherein
   the discharge stand includes:
   a conveyor to which the component is supplied from the posture changer and that conveys the component; and
   a positioner that performs positioning, at a discharge position, of the component conveyed by the conveyor.

7. The component supply device according to claim 1, wherein
   the supply position, the temporary placement position, and the hand-over position are all arranged at a first height.

8. The component supply device according to claim 7, wherein
   the hopper has a push-up that pushes up a component stored in the storage container from a lower second height to the first height at the supply position.

9. The component supply device according to claim 8, wherein
   the push-up includes a recess at an upper end that seats the component, and
   the recess serves as the supply position when at the first height.

* * * * *